(12) United States Patent
Hsieh et al.

(10) Patent No.: US 10,810,417 B2
(45) Date of Patent: Oct. 20, 2020

(54) METHOD, MODULE AND SYSTEM OF GESTURE RECOGNITION

(71) Applicant: Wistron Corporation, New Taipei (TW)

(72) Inventors: Chia-Ta Hsieh, New Taipei (TW); Ting-Feng Ju, New Taipei (TW); Kuo-Hsien Lu, New Taipei (TW); Chih-Hao Chiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 93 days.

(21) Appl. No.: 16/260,118

(22) Filed: Jan. 29, 2019

(65) Prior Publication Data

US 2020/0050841 A1 Feb. 13, 2020

(30) Foreign Application Priority Data

Aug. 10, 2018 (TW) ................ 107127973 A

(51) Int. Cl.
*G06K 9/00* (2006.01)
*G06F 3/01* (2006.01)
*G02B 27/01* (2006.01)
*G06T 7/00* (2017.01)

(52) U.S. Cl.
CPC ..... *G06K 9/00355* (2013.01); *G02B 27/0172* (2013.01); *G06F 3/017* (2013.01); *G06T 7/0002* (2013.01); *G02B 2027/0138* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,649,560 B2 * | 2/2014 | Lee | ................ | G06K 9/00375 382/103 |
| 2011/0164818 A1 | 7/2011 | Matsuno | | |
| 2012/0062736 A1 | 3/2012 | Xiong | | |
| 2012/0069168 A1 * | 3/2012 | Huang | ................ | H04N 21/4223 348/77 |
| 2013/0249786 A1 * | 9/2013 | Wang | ................ | G06K 9/00389 345/156 |
| 2014/0147035 A1 * | 5/2014 | Ding | ................ | G06K 9/00355 382/164 |
| 2014/0286535 A1 * | 9/2014 | Li | ................ | G06T 7/194 382/103 |
| 2016/0091975 A1 | 3/2016 | Kumar | | |
| 2016/0124513 A1 | 5/2016 | Dal Zot | | |
| 2017/0192513 A1 * | 7/2017 | Karmon | ................ | G06K 9/00389 |
| 2017/0193288 A1 * | 7/2017 | Freedman | ................ | G06F 3/017 |
| 2017/0255821 A1 * | 9/2017 | Chen | ................ | G06T 7/50 |
| 2017/0285759 A1 * | 10/2017 | Ahn | ................ | G06F 3/017 |
| 2019/0294870 A1 * | 9/2019 | Xie | ................ | G06K 9/00 |
| 2019/0392205 A1 * | 12/2019 | Tang | ................ | G06T 7/246 |

* cited by examiner

*Primary Examiner* — John B Strege
(74) *Attorney, Agent, or Firm* — Winston Hsu

(57) ABSTRACT

A gesture recognition method includes performing a binarization process on an image to obtain a binarized image, wherein the binarized image includes a plurality of foreground pixels and a plurality of background pixels; determining whether the plurality of foreground pixels surrounds at least a first background pixel; and determining a gesture complying with a predefined gesture in response to determination that the plurality of foreground pixels surrounds the at least a first background pixel.

22 Claims, 14 Drawing Sheets

FIG. 7

METHOD, MODULE AND SYSTEM OF GESTURE RECOGNITION

BACKGROUND OF THE INVENTION

1. Field of the Invention

The present invention relates to a gesture recognition method, a gesture recognition module and a gesture recognition system, and more particularly, to a gesture recognition method, a gesture recognition module and a gesture recognition system capable of recognizing a pinch gesture.

2. Description of the Prior Art

Gesture recognition technology may provide good human-computer interaction and improve the convenience of operation, which has been widely recognized in the industry. Currently, the lens that may recognize gestures may be divided into two types: long-range lens and short-range lens. The long-range lens may be disposed in front of a user, such as a TV or a game console, and the short-range lens may be disposed on a wearable device on the user. Although the two types of lenses can recognize the gesture, the distance and position are different. The gesture information that can be obtained is of course different from the usage habits, resulting in different gestures for these two distances.

With the development of Virtual Reality (VR) devices or Augmented Reality (AR), short-range lenses may be installed on a VR device or an AR device. The VR device or the AR devices may be operated by gesture. Currently, a specific gesture represents a specific effect, which achieves an effect as shortcuts. For example, the gesture of pinching using the thumb and the index finger is easy for the user to achieve, which may be used to instruct the VR device or the AR device to perform a specific operation.

However, recognizing the pinch gesture effectively has not been developed. Therefore, it is necessary to improve the prior art.

SUMMARY OF THE INVENTION

The present invention provides a gesture recognition method, a gesture recognition module and a gesture recognition system capable of recognizing a pinch gesture, to improve over disadvantages of the prior art.

An embodiment of the present invention discloses a gesture recognition method, applied in a gesture recognition module. The gesture recognition method is configured to determine a gesture to operate an electronic device correspondingly. The gesture recognition comprises providing an image capturing device, wherein the image capturing device is configured to sense the gesture to generate an image; performing a binarization process on the image, to obtain a binarized image, wherein the binarized image comprises a plurality of foreground pixels and a plurality of background pixels, the plurality of foreground pixels is corresponding to a foreground pixel value, and the plurality of background pixels is corresponding to a background pixel value; determining whether the plurality of foreground pixels within the binarized image surrounds at least a first background pixel, wherein the first background pixel is one background pixel of the plurality of background pixels; and determining the gesture complying with a predefined gesture in response to determination that the plurality of foreground pixels surrounds the at least a first background pixel, to operate the electronic device correspondingly.

An embodiment of the present invention further discloses a gesture recognition module, configured to operate an electronic device. The gesture recognition module comprises an image capturing device, configured to sense a gesture and generate an image; an image processing unit, performing a binarization process on the image, to obtain a binarized image, wherein the binarized image comprises a plurality of foreground pixels and a plurality of background pixels, the plurality of foreground pixels is corresponding to a foreground pixel value, and the plurality of background pixels is corresponding to a background pixel value; a determining unit, configured to perform the following steps: determining whether the plurality of foreground pixels within the binarized image surrounds at least a first background pixel, wherein the first background pixel is one background pixel of the plurality of background pixels; and determining the gesture complying with a predefined gesture in response to determination that the plurality of foreground pixels surrounds the at least a first background pixel, to operate the electronic device correspondingly.

An embodiment of the present invention further discloses a gesture recognition system, comprising an electronic device; and a gesture recognition module, electrically coupled to the electronic device and configured to operate the electronic device, comprising: an image capturing device, configured to sense a gesture and generate an image; an image processing unit, performing a binarization process on the image, to obtain a binarized image, wherein the binarized image comprises a plurality of foreground pixels and a plurality of background pixels, the plurality of foreground pixels is corresponding to a foreground pixel value, and the plurality of background pixels is corresponding to a background pixel value; and a determining unit, configured to perform the following steps: determining whether the plurality of foreground pixels within the binarized image surrounds at least a first background pixel, wherein the first background pixel is one background pixel of the plurality of background pixels; and determining the gesture complying with a predefined gesture in response to determination that the plurality of foreground pixels surrounds the at least a first background pixel, to operate the electronic device correspondingly.

BRIEF DESCRIPTION OF THE DRAWINGS

FIG. 7 is a schematic diagram of a plurality of outmost pixels in a binarized image.

DETAILED DESCRIPTION

Figure 1:
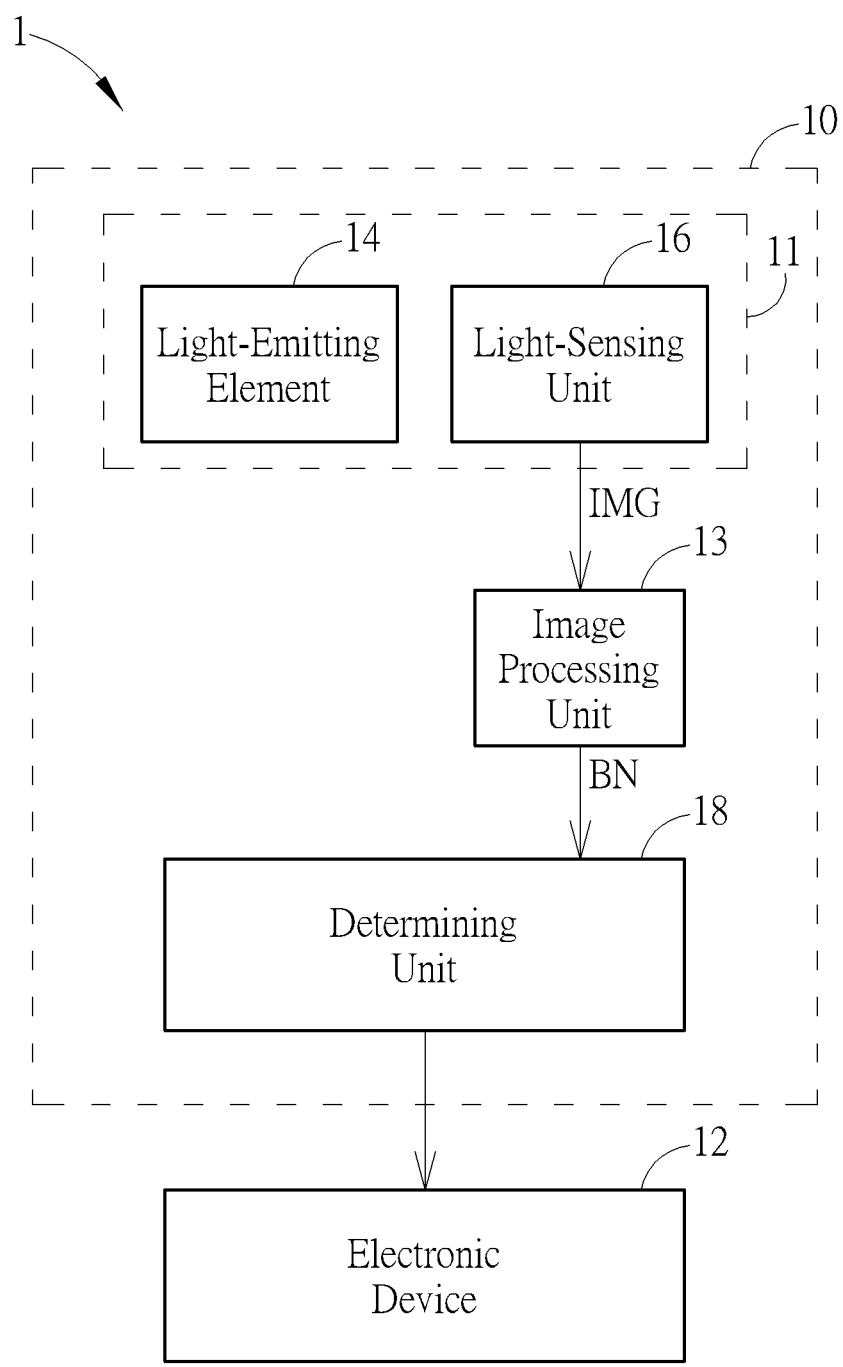
FIG. 1 is a function block diagram of a gesture recognition system according to an embodiment of the present invention.
Figure 2:
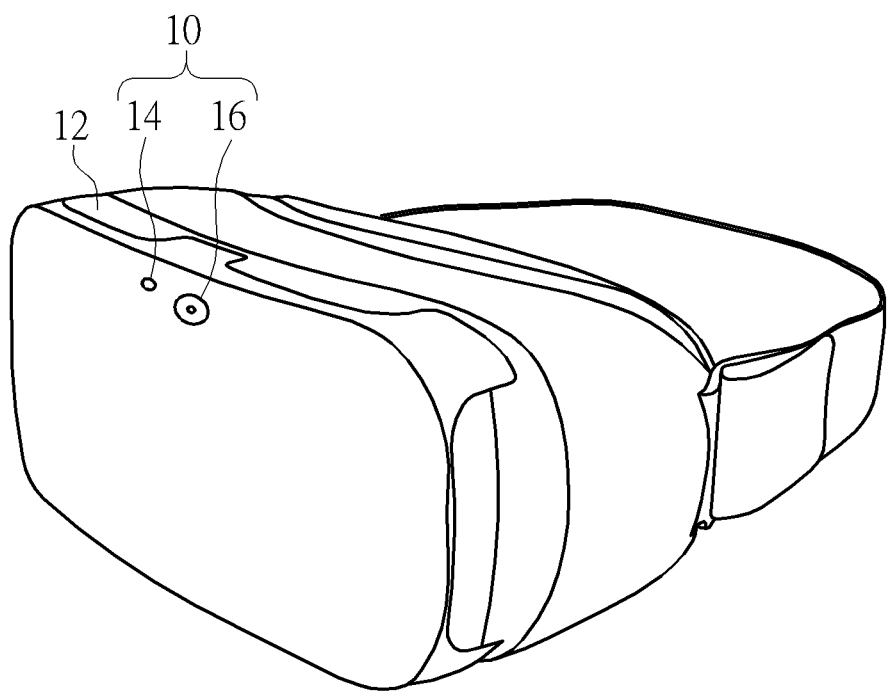
FIG. 2 is a schematic diagram of an appearance of the electronic device of FIG. 1.

FIG. 1 is a function block diagram of a gesture recognition system 1 according to an embodiment of the present invention. FIG. 2 is a schematic diagram of an appearance of a gesture recognition module 10 disposed within an electronic device 12 according to an embodiment of the present invention. The gesture recognition system 1 comprises the gesture recognition module 10 and the electronic device 12. The gesture recognition module 10 may be a part of the electronic device 12 and be electronically connected to an internal component of the electronic device 12, or the gesture recognition module 10 may be an external module of the electronic device 12 and be electronically coupled to an internal component of the electronic device 12. The gesture recognition module 10 and the electronic device 12 may form the gesture recognition system 1. The electronic device 12, for example, may be a VR (Virtual Reality) device, an AR (Augmented Reality) device, or a MR (Mixed Reality) device, i.e., a device which may compute, display or output images. The gesture recognition module 10 may be disposed in front of the electronic device 12. When the user wears the electronic device 12, the gesture recognition module 10 may recognize the gesture of the user, and the electronic device 12 may perform related computation or operation in response to the gesture recognized by the gesture recognition module 10.

The gesture recognition module 10 comprises an image capturing device 11, an image processing unit 13 and a determining unit 18. In an embodiment of the present invention, the image capturing device 11 may capture a gesture image of the user in front of the image capturing device 11 in an optical way. The image capturing device 11 may comprise a light-emitting element 14 and a light-sensing unit 16. In another embodiment of the present invention, the image capturing device 11 may be an RGB camera, a depth camera or other optical camera which can obtain optical images. The image capturing device 11 may even be a sensing device which can obtain the gesture image using, for example, ultrasound or radar device. The light-emitting element 14 is configured to emit an incident light, and may be a light-emitting element emitting an invisible light, e.g., an IR LED (Infrared Light Emitting Diode). The light-sensing unit 16 is configured to receive a reflected light corresponding to the incident light emitted by the light-emitting element 14, and the light-sensing unit 16 may comprise a lens and a light-sensing element. The light-sensing element may be a light-sensing element for the invisible light, e.g., the light-sensing element may be an IR photo diode. In another embodiment of the present invention, the light-sensing element may be a CCD (charge coupled device), a CMOS (complementary metal-oxide semiconductor) device or other device, which is not limited thereto. In the embodiments of the present invention, the light-sensing unit 16 may generate an image IMG according to the reflected light (e.g., IR) corresponding to the incident light emitted by the light-emitting element 14. The image IMG may be a gray level image, or may have been processed to be a gray level image. After the image processing unit 13 receives the image IMG, the image processing unit 13 performs a binarization process to generate a binarized image BG, for distinguishing a foreground, probably comprising a gesture, from a background, probably comprising no gesture. The binarization process may be realized by software program, hardware device or firmware. In another embodiment of the present invention, if the image obtained by the image capturing device (stated in the above) is not a gray level image but an RGB image (or other image), then the image processing unit 13 performs operation converting a received image into a gray level image. Moreover, the image processing unit 13 is not limited to performing the gray level image, the image processing unit 13 may perform other image process operations such as an erosion operation or a dilation operation. The image processing unit 13 may be independent of the determining unit 18 or be integrated into the determining unit 18.

The determining unit 18 receives the binarized image BG, and determines whether a user gesture is a pinch gesture according to the binarized image BG. After the determining unit 18 determines that the user gesture is the pinch gesture, the determining unit 18 may generate a recognition result signal S_P corresponding to the pinch gesture to the electronic device 12, and the electronic device 12 may perform the computation or operation corresponding to the pinch gesture according to the user gesture recognized by the gesture recognition module 10. The determining unit 18 may comprise a processor, a memory and an algorithm software program code. The processor may be a CPU (central processing unit), an AP (application processor), a general purpose (or specific purpose) programmable microprocessor, DSP (digital signal processor, DSP), ISP (image signal processor), GPU (graphics processing unit) or other devices, IC (integrated circuit) and their combinations. The memory, either fixed or movable, may be a RAM (random access memory), a ROM (read-only memory), a flash memory, a hard driver or other memory device, IC and their combinations. The algorithm software program code is loaded to the memory and configured to perform the processed stated in the below. The determining unit 18 of the gesture recognition module 10 of the present invention may be independent of the electronic device 12, or may be included in the electronic device 12, or a part of which is independent of the electronic device 12 and the other part of which is included in the electronic device 12.

Figure 3:
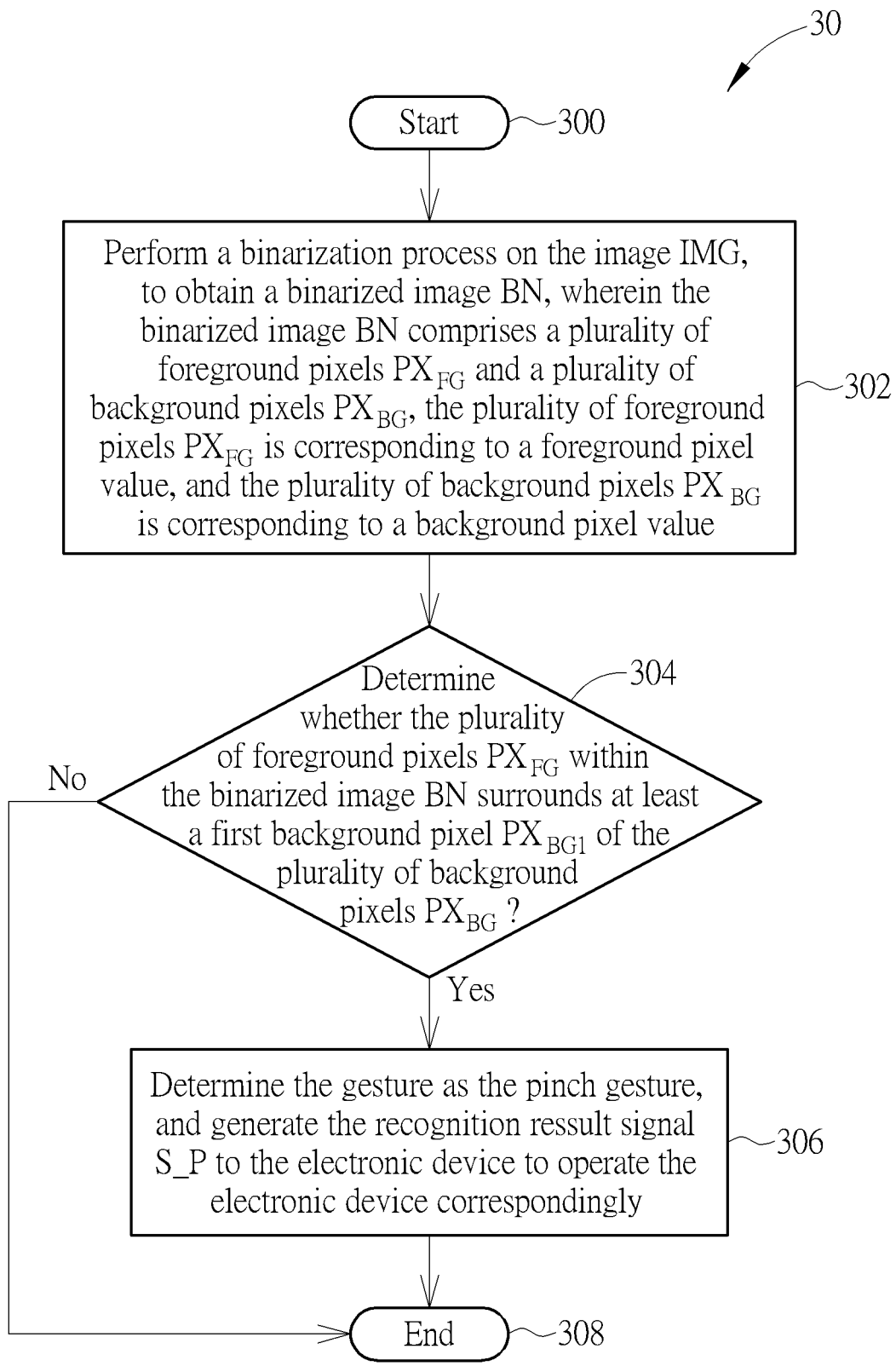
FIG. 3 is a schematic diagram of a process according to an embodiment of the present invention.

Operations of the determining unit 18 determining the user gesture according to the image IMG may be referred to FIG. 3. FIG. 3 is a schematic diagram of a process 30 according to an embodiment of the present invention. The process 30 may be performed by the image processing unit 13 and the determining unit 18, which comprises the following steps:

Step 300: Start.

Step 302: Perform a binarization process on the image IMG, to obtain a binarized image BN, wherein the binarized image BN comprises a plurality of foreground pixels $PX_{FG}$ and a plurality of background pixels $PX_{BG}$, the plurality of foreground pixels $PX_{FG}$ is corresponding to a foreground pixel value, and the plurality of background pixels $PX_{BG}$ is corresponding to a background pixel value.

Step 304: Determine whether the plurality of foreground pixels $PX_{FG}$ within the binarized image BN surrounds at least a first background pixel $PX_{BG1}$ of the plurality of background pixels $PX_{BG}$. If yes, go to Step 306; otherwise, go to Step 308.

Step 306: Determine the gesture as the pinch gesture, and generate the recognition result signal S_P to the electronic device to operate the electronic device correspondingly.

Step 308: End.

In Step 302, the binarized image BN, generated by the image processing unit 13 by performing the binarization process on the image IMG, comprises either white pixels or black pixels. White pixels represent the pixels of the light-sensing unit 16 at which the received light (e.g., IR) is strong, and the white pixels are regarded as foreground pixels. Black pixels represent the pixels of the light-sensing unit 16 at which the received light is weak, and the black pixels are regarded as background pixels. Therefore, the binarized image BN comprises the plurality of foreground pixels $PX_{FG}$ and the plurality of background pixels $PX_{BG}$. The plurality of foreground pixels $PX_{FG}$ is corresponding to a foreground pixel value, and the plurality of background pixels $PX_{BG}$ is corresponding to a background pixel value. In an embodiment, under a condition of the pixel value of the image being represented by 8 bits, the background pixel value is 0 (presenting as black) and the foreground pixel value is 255 (presenting as white).

In Step 304, the determining unit 18 determines whether the plurality of foreground pixels $PX_{FG}$ within the binarized image BN surrounds the first background pixel $PX_{BG1}$, wherein the first background pixel $PX_{BG1}$ is one (background pixel) of the plurality of background pixels $PX_{BG}$. If the background pixel $PX_{BG1}$ surrounded by the foreground pixels $PX_{FG}$ exists in the binarized image BN, the determining unit 18 determines that the pinch gesture is in the image IMG (Step 306). Otherwise, if there is no background pixel $PX_{BG1}$ surrounded by the foreground pixels $PX_{FG}$ in the binarized image BN, the determining unit 18 determines that there is no pinch gesture in the image IMG.

Figure 4:
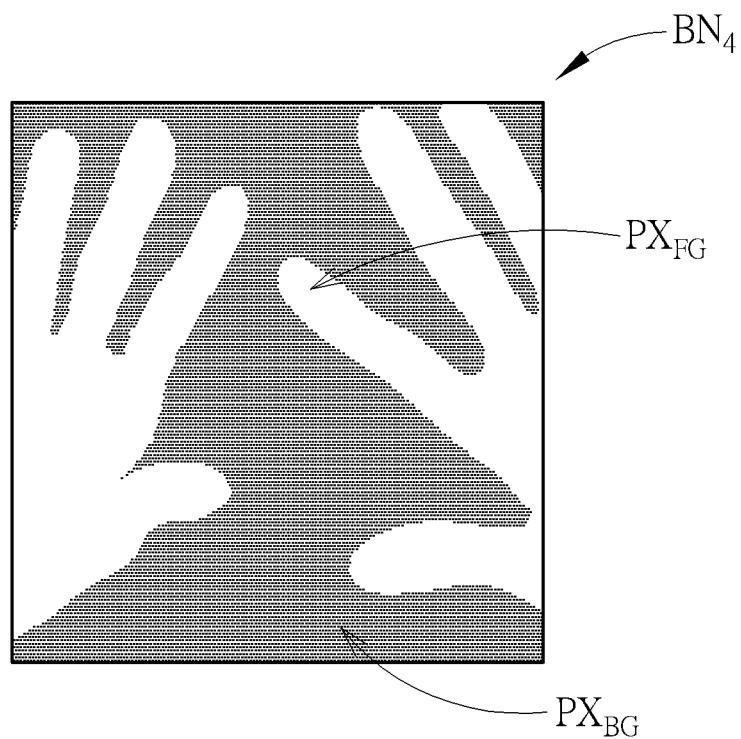
FIG. 4 is a schematic diagram of a binarized image of an image.
Figure 5:
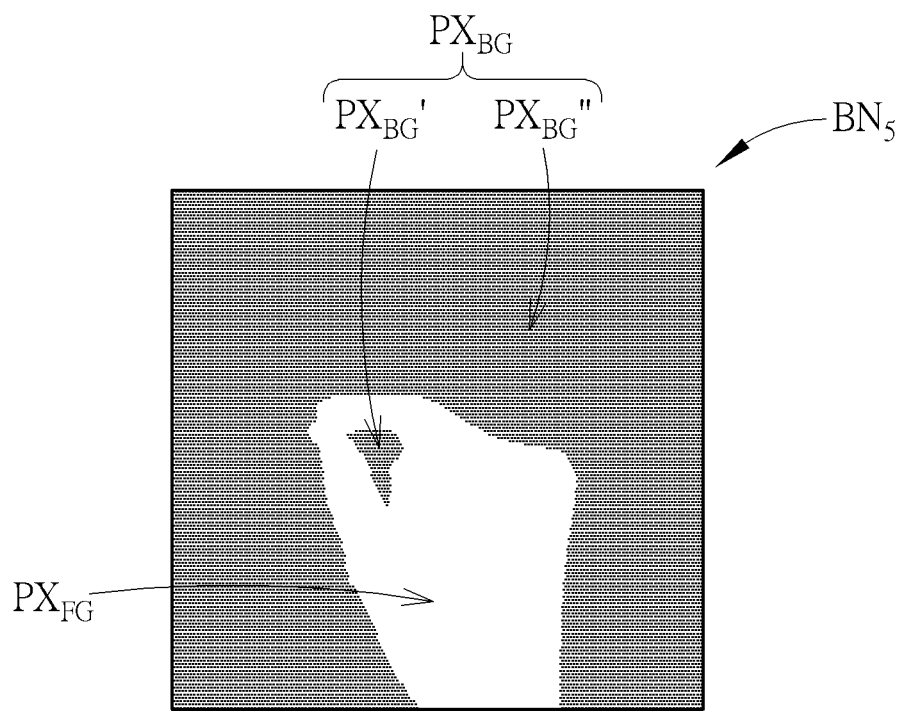
FIG. 5 is a schematic diagram of a binarized image of another image.

According to the process 30, the determining unit 18 may determine whether the pinch gesture is in the image IMG. For example, please refer to FIG. 4 and FIG. 5. FIG. 4 and FIG. 5 are schematic diagrams of a binarized image $BN_4$ and a binarized image $BN_5$, respectively. The binarized images $BN_4$ and $BN_5$ may comprise the foreground pixels $PX_{FG}$ and the background pixels $PX_{BG}$. In FIG. 4, since there is no background pixel $PX_{BG}$ which is surrounded by the foreground pixels $PX_{FG}$, the determining unit 18 would determine that there is no pinch gesture is in the binarized image $BN_4$, after performing the process 30. In comparison, in FIG. 5, a part of background pixels $PX_{BG}$, i.e., the background pixels $PX_{BG}'$, are surrounded by the foreground pixels $PX_{FG}$, and another part of background pixels $PX_{BG}$, i.e., the background pixels $PX_{BG}''$ are not surrounded by the foreground pixels $PX_{FG}$. It means, the background pixels $PX_{BG}$ in the binarized image $BN_5$ comprises the background pixels $PX_{BG}'$ which is surrounded by the foreground pixels $PX_{FG}$ and the background pixels $PX_{BG}''$ which is not surrounded by the foreground pixels $PX_{FG}$. The foreground pixels $PX_{FG}$ surrounding the background pixel $PX_{BG}'$ represents that the background pixels $PX_{BG}'$ are within a closed region formed by the foreground pixels $PX_{FG}$. Notably, the background pixels $PX_{BG}'$ and the background pixels $PX_{BG}''$ are not connected with each other. Therefore, the determining unit 18 would determine the binarized image $BN_5$ includes the pinch gesture, after performing the process 30 in this case.

Figure 6:
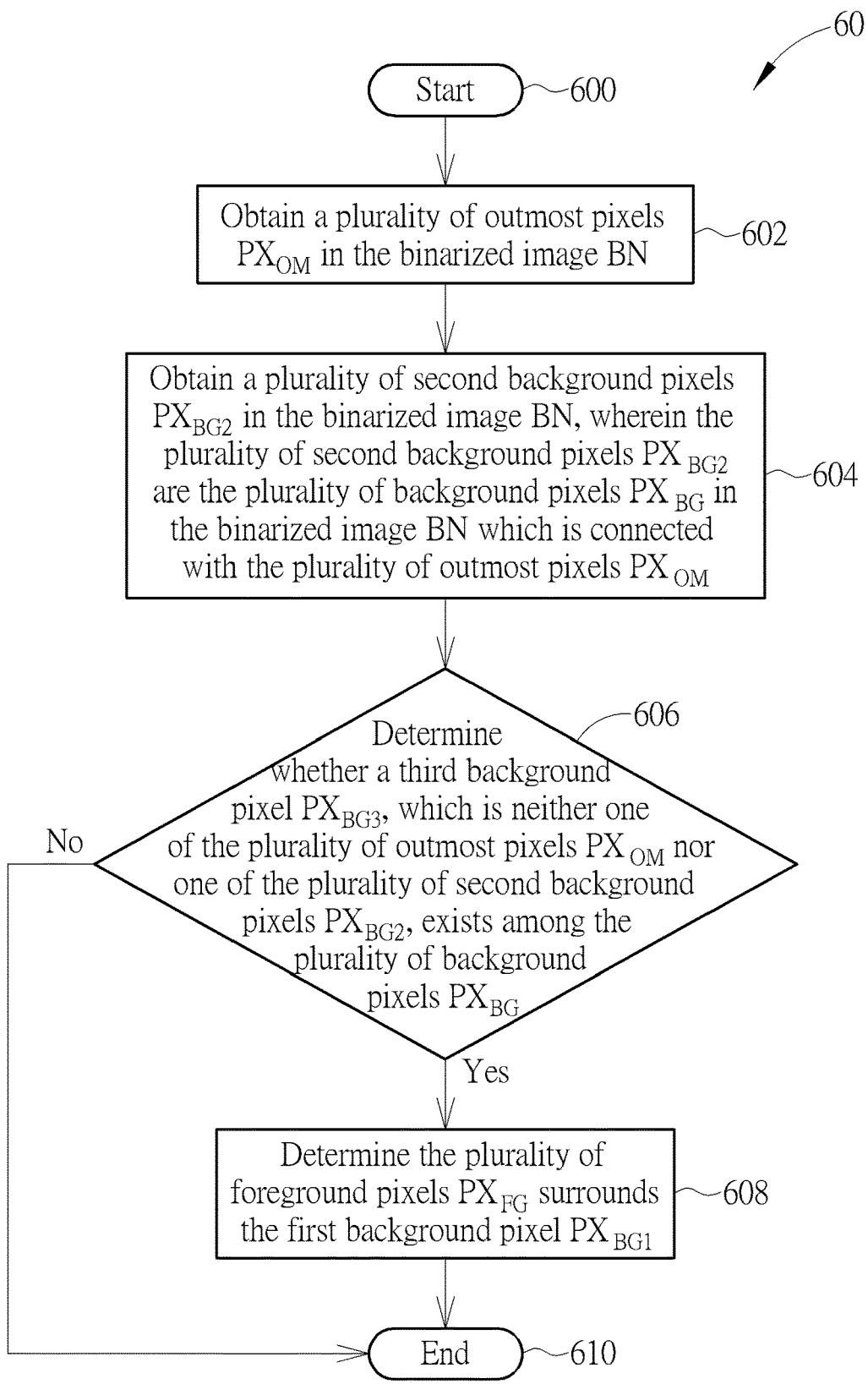
FIG. 6 is a schematic diagram of a process according to an embodiment of the present invention.

Details of Step 304 may be referred to FIG. 6. FIG. 6 is a schematic diagram of a process 60 according to an embodiment of the present invention. The process 60 is an embodiment of details of Step 304, which may be executed by the determining unit 18. The process 60 comprises the following steps:

Step 600: Start.

Step 602: Obtain a plurality of outmost pixels $PX_{OM}$ in the binarized image BN.

Step 604: Obtain a plurality of second background pixels $PX_{BG2}$ in the binarized image BN, wherein the plurality of second background pixels $PX_{BG2}$ is the plurality of background pixels $PX_{BG}$ in the binarized image BN which is connected with the plurality of outmost pixels $PX_{OM}$.

Step 606: Determine whether a third background pixel $PX_{BG3}$, which is neither one of the plurality of outmost pixels $PX_{OM}$ nor one of the plurality of second background pixels $PX_{BG2}$, exists among the plurality of background pixels $PX_{BG}$. If yes, go to Step 608; otherwise, go to Step 610.

Step 608: Determine the plurality of foreground pixels $PX_{FG}$ surrounds the first background pixel $PX_{BG1}$.

Step 610: End.

Figure 7:
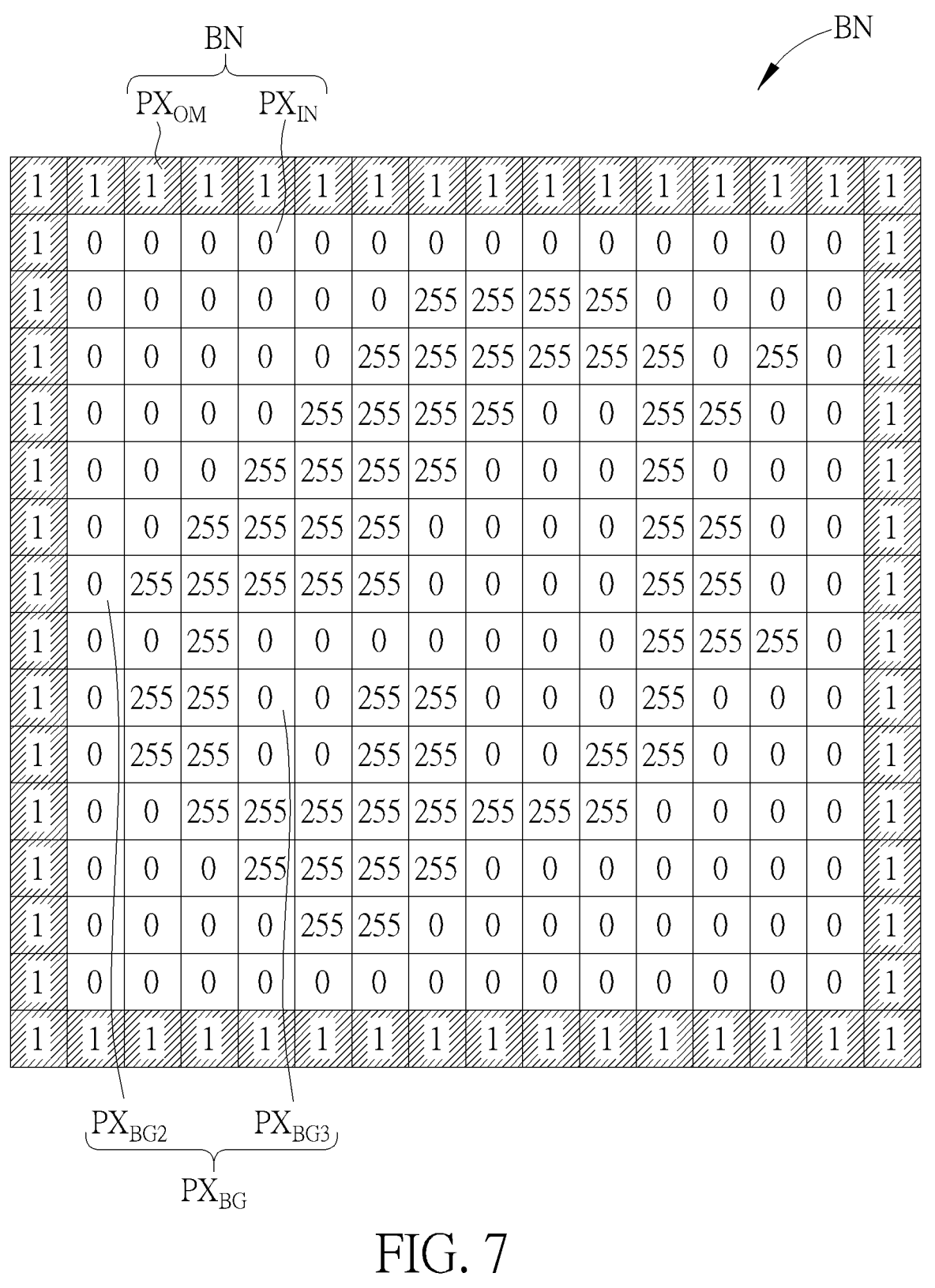

In Step 602, the determining unit 18 obtains the plurality of outmost pixels $PX_{OM}$. For example, the determining unit 18 may obtain the leftmost pixels, the upmost pixels, the rightmost pixels and the downmost pixels in the binarized image BN as the plurality of outmost pixels $PX_{OM}$. Please refer to FIG. 7. FIG. 7 is a schematic diagram of the plurality of outmost pixels $PX_{OM}$ in the binarized image BN. In FIG. 7, the slash squares represent the outmost pixels $PX_{OM}$ in the binarized image BN, and the white squares represent a plurality of interior pixels $PX_{IN}$ in the binarized image BN. The numbers in the slash squares represent label values of the outmost pixels $PX_{OM}$ (which will be described later on). The numbers in the white squares represent pixel values of the interior pixels $PX_{IN}$. As can be seen from FIG. 7, the outmost pixels $PX_{OM}$ is on the periphery (four sides) of the binarized image BN. In addition, the binarized image BN is composed of the plurality of outmost pixels $PX_{OM}$ and the plurality of interior pixels $PX_{IN}$, which means that a pixel within the binarized image BN is either the outmost pixel $PX_{OM}$ (one of the outmost pixels $PX_{OM}$) or the interior pixel $PX_{IN}$ (one of the interior pixel $PX_{IN}$).

In Step 604, the determining unit 18 obtains the plurality of second background pixels $PX_{BG2}$ which is connected with the plurality of outmost pixels $PX_{OM}$. The plurality of second background pixels $PX_{BG2}$ connected with the plurality of outmost pixels $PX_{OM}$ comprises the second background pixels $PX_{BG2\_1}$, $PX_{BG2\_2}$, ..., $PX_{BG2\_n-1}$, $PX_{BG2\_n}$. For example, the second background pixel $PX_{BG2\_1}$ is directly adjacent to the outmost pixels $PX_{OM}$, the second background pixel $PX_{BG2\_2}$ is directly adjacent to the second background pixel $PX_{BG2\_1}$ (which represents that the second background pixel $PX_{BG2\_2}$ is indirectly adjacent to at least an outmost pixel $PX_{OM}$ through the second background pixel $PX_{BG2,1}$), and so on and so forth, the second background pixel $PX_{BG2,n}$ is directly adjacent to the second background pixel $PX_{BG2,n-1}$ (which represents that the second background pixel $PX_{BG2,n}$ is indirectly adjacent to at least an outmost pixel $PX_{OM}$ through the second background pixel $PX_{BG2,1}$-$PX_{BG2,n-1}$). In this case, the plurality of second background pixels $PX_{BG2}$ composed of the second background pixel $PX_{BG2,1}$-$PX_{BG2,n}$ is directly or indirectly connected with the plurality of outmost pixels $PX_{OM}$. In short, "the plurality of second background pixels $PX_{BG2}$ being directly or indirectly connected with the plurality of outmost pixels $PX_{OM}$" represents that "one second background pixel $PX_{BG2}$ is directly adjacent to one of the plurality of outmost pixels $PX_{OM}$," or "one second background pixel $PX_{BG2}$ is indirectly adjacent to one of the plurality of outmost pixels $PX_{OM}$ through other second background pixel(s) $PX_{BG2}$".

In Step 606, the determining unit 18 determines whether the third background pixel $PX_{BG3}$, which is neither one of the outmost pixels $PX_{OM}$ nor one of the second background pixel $PX_{BG2}$, exists among the plurality of background pixels $PX_{BG}$. In other words, the determining unit 18 determines whether an background pixel, other than the plurality of outmost pixels $PX_{OM}$ and the plurality of second background pixels $PX_{BG2}$, exists among the plurality of background pixels $PX_{BG}$ in the binarized image BN (if yes, the background pixel is named as the third background pixel $PX_{BG3}$). If the third background pixel $PX_{BG3}$, which is neither directly nor indirectly connected with the plurality of outmost pixels $PX_{OM}$, exists in the binarized image BN, it represents that the third background pixel $PX_{BG3}$ is surrounded by the plurality of foreground pixels $PX_{FG}$ and is not connected with any of the second background pixel $PX_{BG2}$ (at this time, the third background pixel $PX_{BG3}$ is the first background pixel $PX_{BG1}$ stated in Step 304), and the determining unit 18 would determines that there is at least a first background pixel $PX_{BG1}$ which is surrounded by the plurality of foreground pixels $PX_{FG}$ (Step 608).

Details of Step 604 are not limited. For the ease of the computation, a method of tag/class can be used, for example, to label all of the background pixel $PX_{BG}$ as (different) label/tag value(s), and label the second background pixel $PX_{BG2}$ (i.e., the background pixel $PX_{BG}$ which are connected with the plurality of outmost pixels $PX_{OM}$) as a same label value. Finally, the determining unit 18 may check whether a background pixel with a different label value, which is different from the label value of the outmost pixels $PX_{OM}$, exists. If yes, the determining unit 18 may determine that the third background pixel $PX_{BG3}$ exists.

Figure 8:
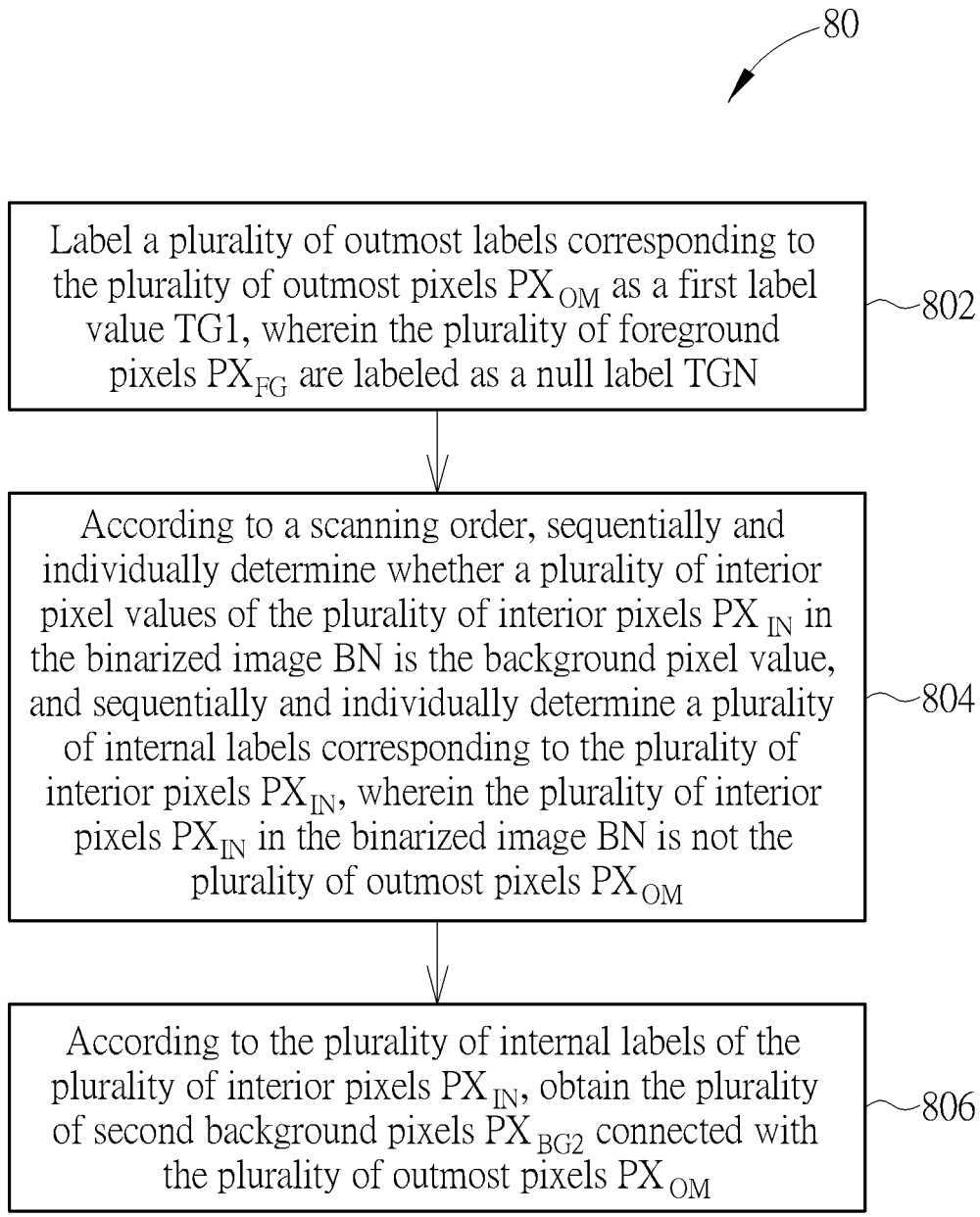
FIG. 8 is a schematic diagram of a process according to an embodiment of the present invention.

Specifically, FIG. 8 is a schematic diagram of a process 80 according to an embodiment of the present invention. The process 80 is an embodiment of details of Step 604, which may be executed by the determining unit 18. The process 80 comprises the following steps:

Step 802: Label a plurality of outmost labels corresponding to the plurality of outmost pixels $PX_{OM}$ as a first label value TG1, wherein the plurality of foreground pixels $PX_{FG}$ are labeled as a null label TGN.

Step 804: According to a scanning order, sequentially and individually determine whether a plurality of interior pixel values of the plurality of interior pixels $PX_{IN}$ in the binarized image BN is the background pixel value, and sequentially and individually determine a plurality of internal labels corresponding to the plurality of interior pixels $PX_{IN}$, wherein the plurality of interior pixels $PX_{IN}$ in the binarized image BN is not the plurality of outmost pixels $PX_{OM}$.

Step 806: According to the plurality of internal labels of the plurality of interior pixels $PX_{IN}$, obtain the plurality of second background pixels $PX_{BG2}$ connected with the plurality of outmost pixels $PX_{OM}$.

Before performing the process 80, all pixels in the binarized image BN are defaulted to have the null label TGN. After the process 80 is executed, all of the background pixels and the outmost pixels in the binarized image BN would be labeled as specific label value(s), other than the null label TGN, and only the foreground pixels are remained as the null label TGN.

In Step 802, the determining unit 18 labels the plurality of outmost labels corresponding to the plurality of outmost pixels $PX_{OM}$ as the first label value TG1, and labels the plurality of foreground pixels $PX_{FG}$ as the null label TGN. In an embodiment, the first label value TG1 may be 1. Please again refer to FIG. 7. In FIG. 7, the determining unit 18 labels the plurality of outmost pixels $PX_{OM}$ as 1, In addition, the interior pixel values of the interior pixels $PX_{IN}$ in FIG. 7 may be either 0 (the background pixel value) or 255 (the foreground pixel value).

Figure 9:
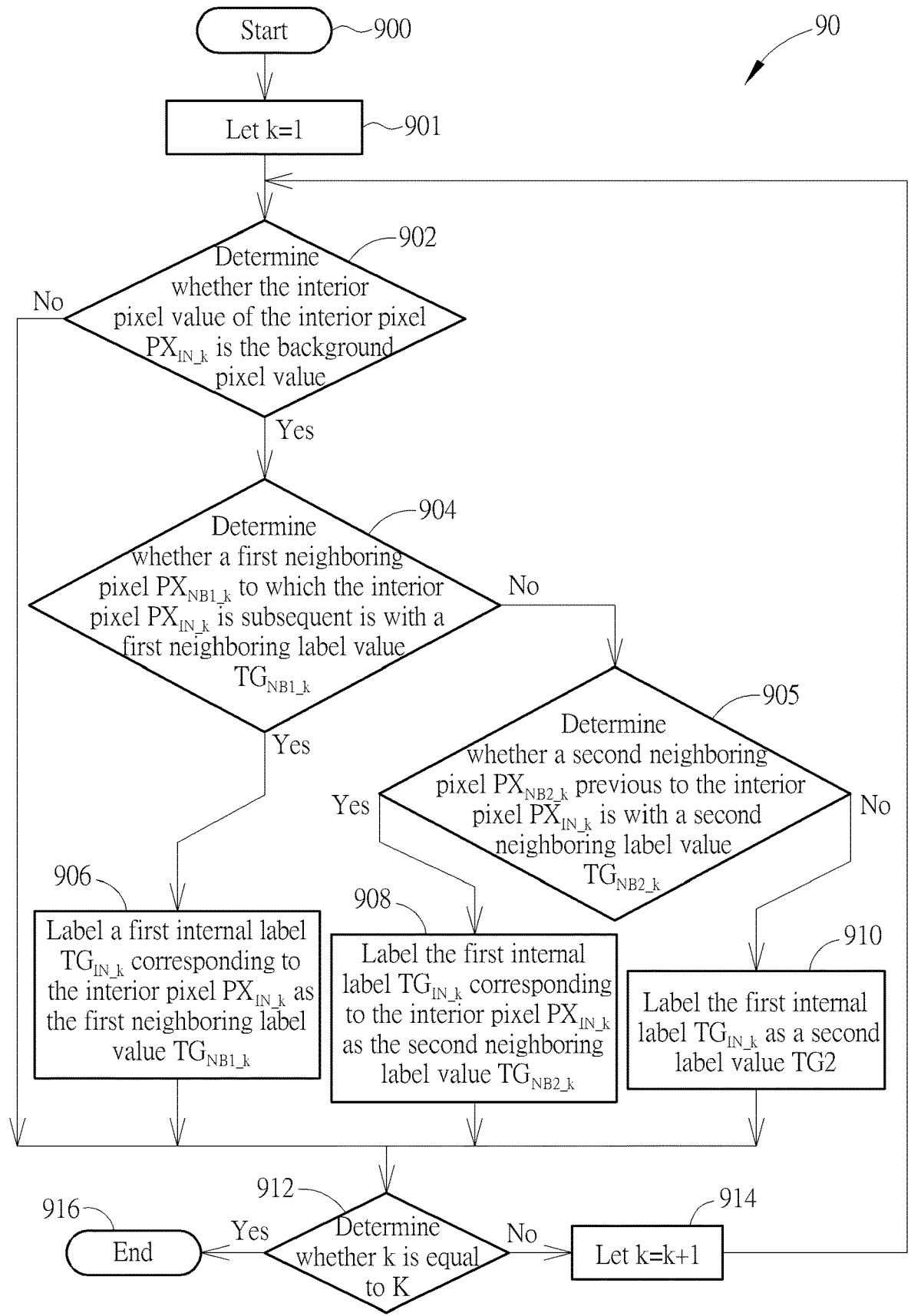
FIG. 9 is a schematic diagram of a process according to an embodiment of the present invention.

In Step 804, the determining unit 18 determines whether each interior pixel $PX_{IN\_k}$ (k=1, . . . ,K) in the binarized image BN is the background pixel, and determine an interior label corresponding to the interior pixel $PX_{IN\_k}$, according to the scanning order. An index k may represent the scanning order, and K is a number of the interior pixels $PX_{IN}$. In an embodiment, the determining unit 18 may execute a process 90 first and then execute a process A0, to accomplish Step 804. FIG. 9 is a schematic diagram of the process 90 according to an embodiment of the present invention. As shown in FIG. 9, the process 90 comprises the following steps:

Step 900: Start.

Step 901: Let k=1.

Step 902: Determine whether the interior pixel value of the interior pixel $PX_{IN\_k}$ is the background pixel value. If yes, go to Step 904; otherwise, go to Step 912.

Step 904: Determine whether a first neighboring pixel $PX_{NB1\_k}$ to which the interior pixel $PX_{IN\_k}$ is subsequent is with a first neighboring label value $TG_{NB1\_k}$. If yes, go to Step 906; otherwise, go to Step 905.

Step 905: Determine whether a second neighboring pixel $PX_{NB2\_k}$ previous to the interior pixel $PX_{IN\_k}$ is with a second neighboring label value $TG_{NB2\_k}$. If yes, go to Step 908; otherwise, go to Step 910.

Step 906: Label a first internal label $TG_{IN\_k}$ corresponding to the interior pixel $PX_{IN\_k}$ as the first neighboring label value $TG_{NB1\_k}$.

Step 908: Label the first internal label $TG_{IN\_k}$ corresponding to the interior pixel $PX_{IN\_k}$ as the second neighboring label value $TG_{NB2\_k}$.

Step 910: Label the first internal label $TG_{IN\_k}$ as a second label value TG2.

Step 912: Determine whether k is equal to K. If yes, go to Step 916; otherwise, go to Step 914.

Step 914: Let k=k+1.

Step 916: End.

Figure 11:
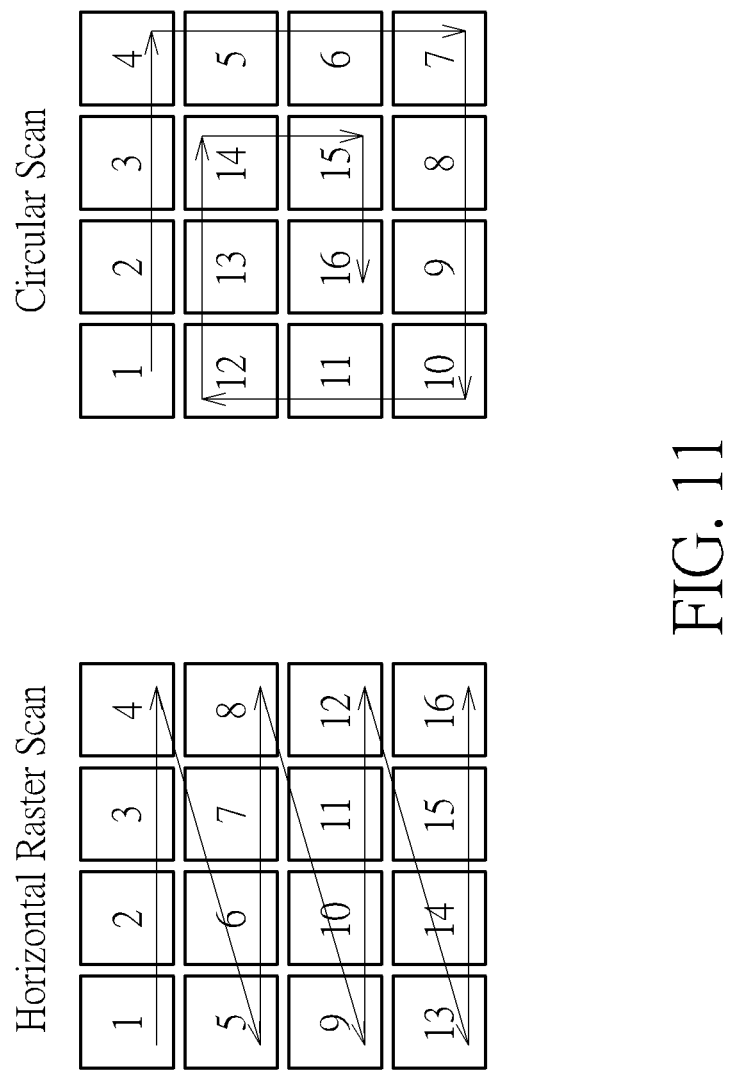
FIG. 11 illustrates an order of raster scan or an order of circular scan.

In the process 90, the scanning order may be an order of raster scan or an order of circular scan, which is not limited thereto. The order of raster scan and the order of circular scan (from outward to inward) are illustrated in FIG. 11. In FIG. 11, each square represents a pixel, and the number within the square represents the index k of the scanning order. According to different scanning orders, the index k of the scanning order may be distributed differently.

In Step 900, all of the interior pixel $PX_{IN\_k}$ (k=1, . . . , K) are defaulted to be with the null label TGN.

In Step 902, the determining unit 18 determines whether the interior pixel $PX_{IN\_k}$ is the background pixel. If the interior pixel $PX_{IN\_k}$ is the foreground pixel (k<K), the determining unit 18 would go to Step 912 and 914, to maintain the foreground pixels (the interior pixel $PX_{IN\_k}$) to be with the null label TGN, and determines whether the next interior pixel $PX_{IN\_k+1}$ is the background pixel. If the interior pixel $PX_{IN\_k}$ is the background pixel, the determining unit 18 would execute some steps of Steps 904-910, to label the first internal label $TG_{IN\_k}$ to the interior pixel $PX_{IN\_k}$, wherein the first internal label $TG_{IN\_k}$ may be one of the label values TG1, TG2 and the neighboring label values $TG_{NB1\_k}$, $TG_{NB2\_k}$.

In Step 904, the determining unit 18 determines whether the first neighboring pixel $PX_{NB1\_k}$ is labeled as the first neighboring label value $TG_{NB1\_k}$, which is equivalent to determining whether the first neighboring pixel $PX_{NB1\_k}$ is the background pixel. The first neighboring pixel $PX_{NB1\_k}$ is directly adjacent to the interior pixel $PX_{IN\_k}$ in a first direction, and according to the scanning order, the first neighboring pixel $PX_{NB1\_k}$ is previous to the interior pixel $PX_{IN\_k}$. That is, the first neighboring pixel $PX_{NB1\_k}$ may be another interior pixel $PX_{IN\_k-k'}$ (k'=1, . . . , k−1) which is previous to the interior pixel $PX_{IN\_k}$. In addition, the first direction may be parallel to one of a horizontal direction and a vertical direction. Take the raster scan from left to right as an example, the first neighboring pixel $PX_{NB1\_k}$ to which the interior pixel $PX_{IN\_k}$ is subsequent may be the pixel on the left of the interior pixel $PX_{IN\_k}$ (where the first direction may be in a leftward direction). The first neighboring pixel $PX_{NB1\_k}$ may also be the outmost pixels $PX_{OM}$. For circular scan, the first neighboring pixel $PX_{NB1\_k}$ may be the interior pixel $PX_{IN\_k-1}$ corresponding to the previous iteration.

If the first neighboring pixel $PX_{NB1\_k}$ to which the interior pixel $PX_{IN\_k}$ is subsequent has already been labeled as the first neighboring label value $TG_{NB1\_k}$, in Step 906, the interior pixel $PX_{IN\_k}$ would inherit the first neighboring label value $TG_{NB1\_k}$ of the first neighboring pixel $PX_{NB1\_k}$. If the first neighboring pixel $PX_{NB1\_k}$ to which the interior pixel $PX_{IN\_k}$ is subsequent is the outmost pixels $PX_{OM}$, the first neighboring label value $TG_{NB1\_k}$ would be the first label value TG1.

If the first neighboring pixel $PX_{NB1\_k}$ to which the interior pixel $PX_{IN\_k}$ is subsequent is the foreground pixel (representing that the first neighboring pixel $PX_{NB1\_k}$ is labeled as the null label TGN), in Step 905, the determining unit 18 further determines whether the second neighboring pixel $PX_{NB2\_k}$ is the background pixel, which is to determine whether the second neighboring pixel $PX_{NB2\_k}$ has been labeled as the second neighboring label value $TG_{NB2\_k}$. The second neighboring pixel $PX_{NB2\_k}$ is the pixel previous to the interior pixel $PX_{IN\_k}$ according to the scanning order, which may be directly adjacent to the interior pixel $PX_{IN\_k}$ in a second direction. The second direction may be parallel to one of the horizontal direction and the vertical direction, and the second direction is perpendicular to the first direction. For the raster scan, the second neighboring pixel $PX_{NB2\_k}$ may be on the up of the interior pixel $PX_{IN\_k}$ and directly adjacent to the interior pixel $PX_{IN\_k}$ (where the second direction may be in an upward direction), which may also be the outmost pixels $PX_{OM}$. For the circular scan from outward to inward, take "the interior pixel $PX_{IN\_k}$ located at the right of the binarized image BN and the interior pixel $PX_{IN\_k-1}$ corresponding to the previous iteration located at the up of the interior pixel $PX_{IN\_k}$ corresponding to the current iteration" as an example, the first neighboring pixel $PX_{NB1\_k}$ is the interior pixel $PX_{IN\_k-1}$ located at the up of the interior pixel $PX_{IN\_k}$, and the second neighboring pixel $PX_{NB2\_k}$ is another pixel at the right of the interior pixel $PX_{IN\_k}$.

If the second neighboring pixel $PX_{NB2\_k}$ has been labeled as the second neighboring label value $TG_{NB2\_k}$, in Step 908, the interior pixel $PX_{IN\_k}$ would inherit the second neighboring label value $TG_{NB2\_k}$ of the second neighboring pixel $PX_{NB2\_k}$. If the second neighboring pixel $PX_{NB2\_k}$ is the outmost pixels $PX_{OM}$, the second neighboring label value $TG_{NB2\_k}$ would be the first label value TG1.

If the first neighboring pixel $PX_{NB1\_k}$ and the second neighboring pixel $PX_{NB2\_k}$ are the foreground pixels (which represents that the first neighboring pixel $PX_{NB1\_k}$ and the second neighboring pixel $PX_{NB2\_k}$ are labeled as the null label TGN), in Step 910, the determining unit 18 labels the interior pixel $PX_{IN\_k}$ as the second label value TG2. That is, the determining unit 18 determines that the first internal label $TG_{IN\_k}$ of the first interior pixel $PX_{IN\_k}$ is the second label value TG2, where the second label value TG2 is different from the first label value TG1. In an embodiment, suppose that the first label value TG1 is equal to 1, the second label value TG2 is set to be equal to 2 when the determining unit 18 executes the $1^{st}$ iteration of the process 90, the second label value TG2 is set to be equal to 3 when the determining unit 18 executes the $2^{nd}$ iteration of the process 90, (and so on and so forth) and the second label value TG2 is set to be equal to (n+1) when the determining unit 18 executes the $n^{th}$ iteration of the process 90.

Figure 12:
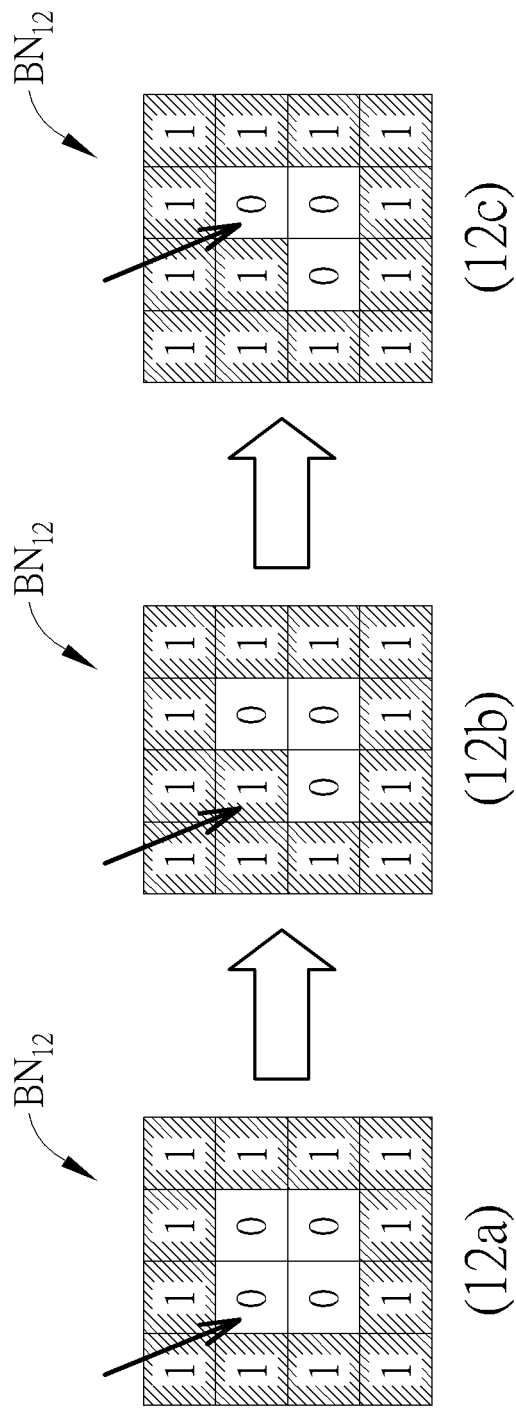
FIG. 12 illustrates an intermediate result of performing the process in FIG. 9 on a binarized image.
Figure 13:
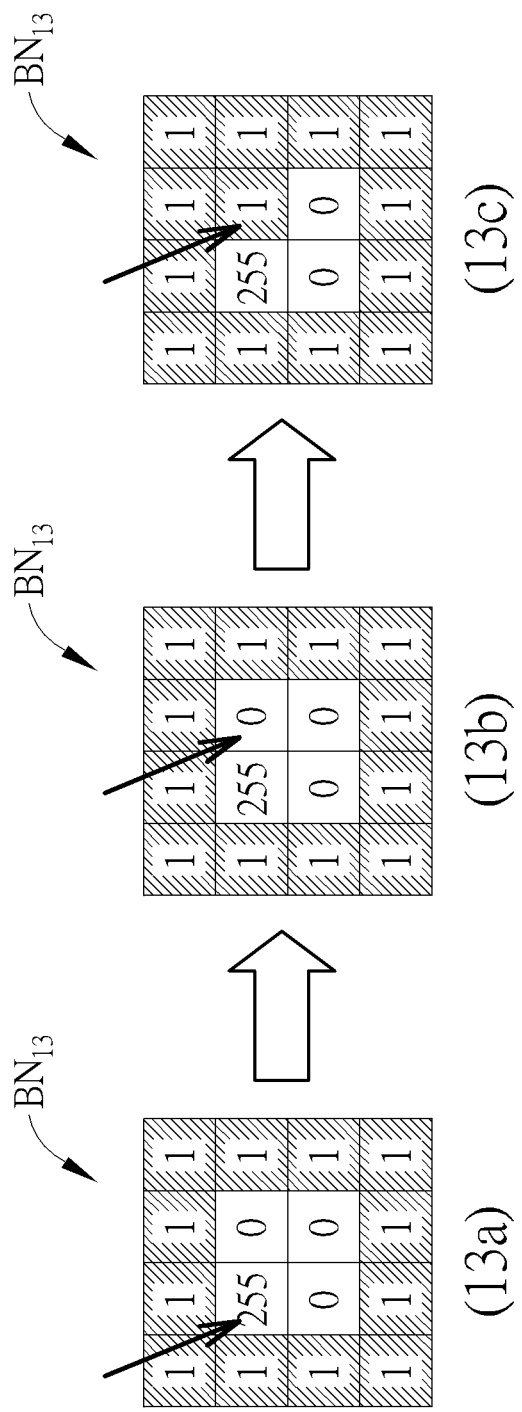
FIG. 13 illustrates an intermediate result of performing the process in FIG. 9 on a binarized image.
Figure 14:
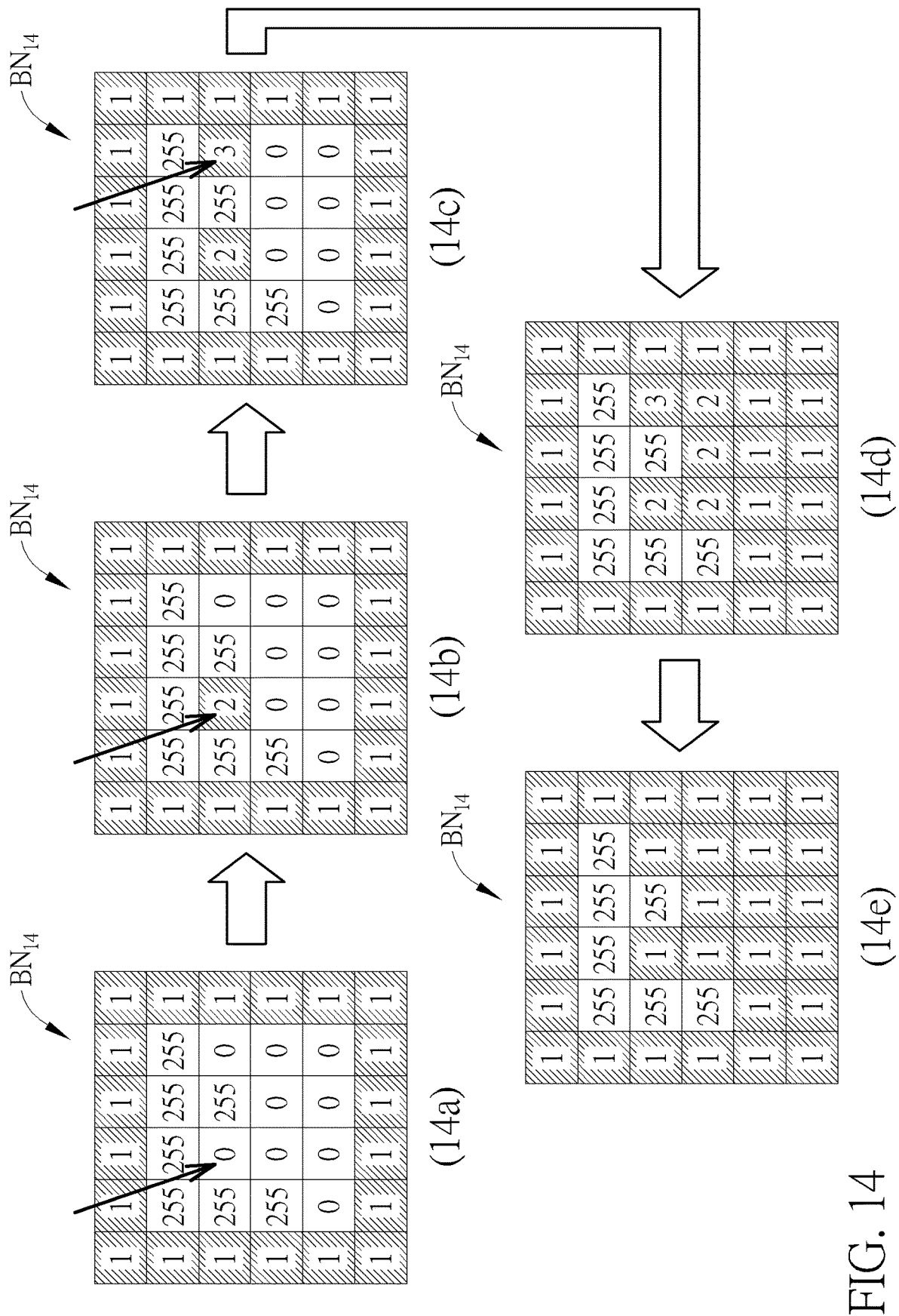
FIG. 14 illustrates an intermediate result and a final result of performing the processes in FIG. 9 and FIG. 10 on a binarized image.

For clearly illustrating the process 90, please refer to FIGS. 12-14. FIG. 12 and FIG. 13 illustrate intermediate results of performing the process 90 on binarized images $BN_{12}$ and $BN_{13}$, respectively. FIG. 14 illustrates an intermediate result and a final result of performing the processes 90 and A0 on a binarized image $BN_{14}$. In the embodiments of FIGS. 12-14, the horizontal raster scan from left to right is adopted. The numbers in the white squares in FIGS. 12-14 represent the pixel values after the binarization process, and the numbers in the slash squares represent the label values.

In the embodiment illustrated in FIG. 12, the determining unit 18 is to perform the determining operations of Step 904-910 on the (2,2)-th interior pixel (denoted as $PX_{IN\_(2,2)}$) in the binarized image $BN_{12}$, as shown in the subfigure 12a. Since the pixel value of the interior pixel $PX_{IN\_(2,2)}$ is 0, which is the background pixel (Step 902), and the pixel $PX_{IN\_(1,2)}$ adjacent to and on the left of the interior pixel $PX_{IN\_(2,2)}$ is with the label value as 1 (Step 904), the interior pixel $PX_{IN\_(2,2)}$ would inherit the label value 1 of the pixel $PX_{IN\_(1,2)}$ (Step 906), as shown in the subfigure 12b, and proceeds to determine the pixel $PX_{IN\_(3,2)}$, as shown in the subfigure 12c.

In the embodiment illustrated in FIG. 13a, the determining unit 18 is to perform the determining operation of Step 904-910 on the (2,2)-th interior pixel in the binarized image $BN_{13}$, as show in the subfigure 13. Since the pixel value of the interior pixel $PX_{IN\_(2,2)}$ is 255, which is the foreground pixels, the determining unit 18 remains/keeps the null label for the interior pixel $PX_{IN\_(2,2)}$, and proceeds to the determining operation of Step 904-910 on the next interior pixel $PX_{IN\_(3,2)}$, as shown in the subfigure 13b (corresponding to the path from Step 902 to Steps 912 and 914 in FIG. 9). Although the interior pixel $PX_{IN\_(2,2)}$ adjacent to and on the left of the interior pixel $PX_{IN\_(3,2)}$ (at this time, the interior pixel $PX_{IN\_(2,2)}$ is corresponding to the first neighboring pixel adjacent to the interior pixel $PX_{IN\_(3,2)}$) has the null label (corresponding to the path from Step 904 to Step 905), the pixel $PX_{IN\_(1,3)}$ on the up of and adjacent to the interior pixel $PX_{IN\_(3,2)}$ (at this time, the interior pixel $PX_{IN\_(1,3)}$ is corresponding to the second neighboring pixel adjacent to the interior pixel $PX_{IN\_(3,2)}$) has the label value as 1 (Step 905). Hence, the interior pixel $PX_{IN\_(3,2)}$ would inherit the label value 1 of the pixel $PX_{IN\_(3,1)}$ (Step 908), as shown in the subfigure 13c (the label value 1 is corresponding to the first label value TG1).

In the embodiment illustrated in FIG. 14, the determining unit 18 is to perform the determining operation of Step 904-910 on the (3,3)-th interior pixel (denoted as $PX_{IN\_(3,3)}$) in the binarized image $BN_{14}$, as shown in the subfigure 14a. Since the pixel $PX_{IN\_(2,3)}$ adjacent to $PX_{IN\_(3,3)}$ on the left (corresponding to the first neighboring pixel) and the pixel $PX_{IN\_(3,2)}$ adjacent to $PX_{IN\_(3,3)}$ on the up (corresponding to the second neighboring pixel) are both foreground pixels, the determining unit 18 executes Step 910 at the $1^{st}$ time, where the determining unit 18 labels the interior pixel $PX_{IN\_(3,3)}$ as 2, as shown in the subfigure 14b, where the label value 2 is corresponding to the second label value TG2). Similar, when the determining the interior pixel $PX_{IN\_(5,3)}$, the determining unit 18 executes Step 910 at the $2^{nd}$ time, where the determining unit 18 labels the interior pixel $PX_{IN\_(5,3)}$ as 3, as shown in the subfigure 14c, where the label value 3 is also corresponding to the second label value TG2. In addition, the subfigure 14d illustrates the final result of the determining unit 18 performing the process 90.

By the process 90, by keeping the null label for the foreground pixels, the determining unit 18 may preliminarily exclude the foreground pixels. Furthermore, the determining unit 18 may label the background pixels as specific label values. After that, by the process A0, the determining unit 18 may determine all of the background pixels which are connected with the outmost pixels $PX_{OM}$, i.e., the plurality of second background pixels $PX_{BG2}$ stated in Step 604.

Figure 10:
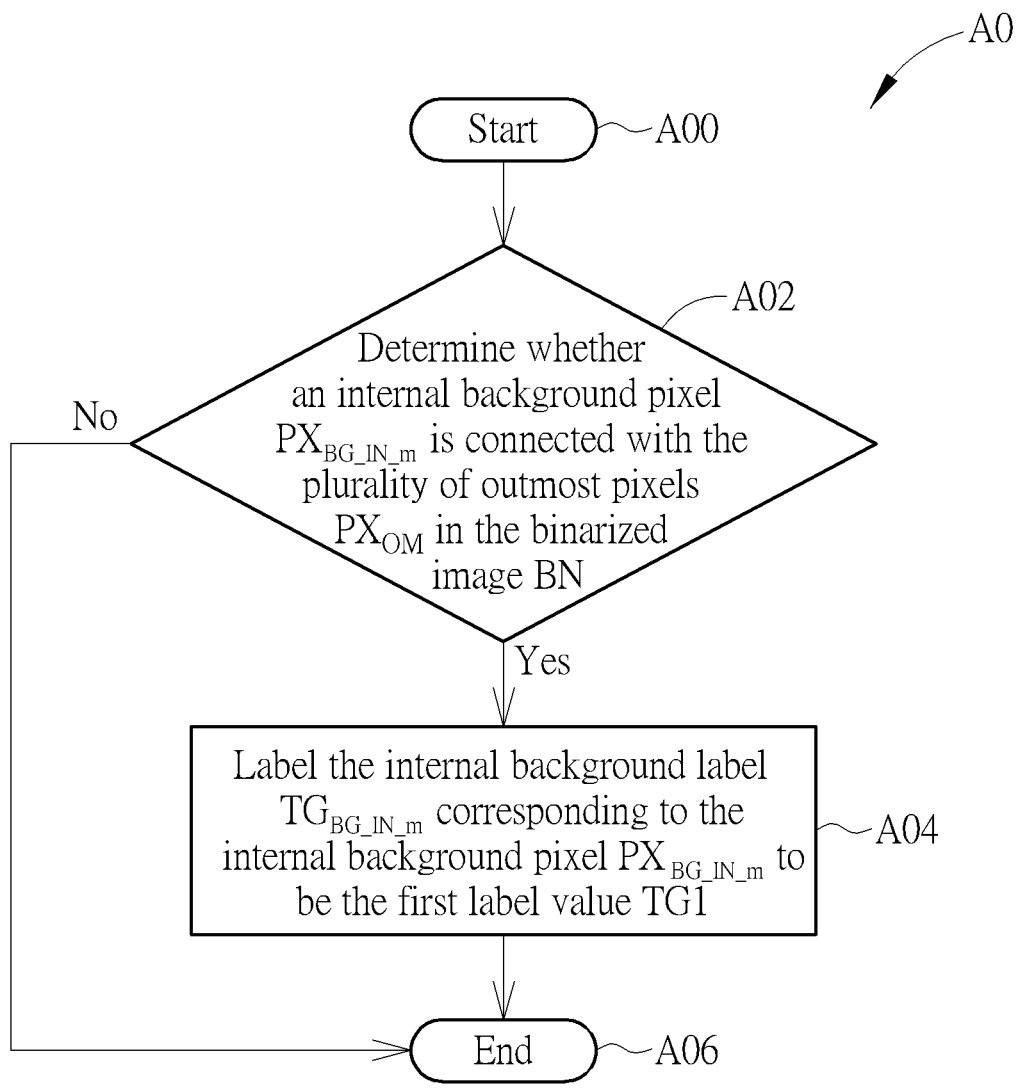
FIG. 10 is a schematic diagram of a process according to an embodiment of the present invention.

FIG. 10 is a schematic diagram of the process A0 according to an embodiment of the present invention. The determining unit 18 may perform the process A0 on each of the internal background pixels $PX_{BG\_IN}$ in the binarized image BN. The internal background pixel $PX_{BG\_IN}$ represent that "the pixel $PX_{BG\_IN}$ is an interior pixel of the plurality of interior pixels $PX_{IN}$" and "the pixel $PX_{BG\_IN}$ is a background pixel of the plurality of background pixels $PX_{BG}$". As shown in FIG. 10, the process A0 comprises the following steps:

Step A00: Start.

Step A02: Determine whether an internal background pixel $PX_{BG\_IN\_m}$ is connected with the plurality of outmost pixels $PX_{OM}$ in the binarized image BN. If yes, go to Step A04; otherwise, go to Step A06.

Step A04: Label the internal background label $TG_{BG\_IN\_m}$ corresponding to the internal background pixel $PX_{BG\_IN\_m}$ to be the first label value TG1.

Step A06: End.

In Step A02, the internal background pixel $PX_{BG\_IN\_m}$ being connected with the plurality of outmost pixels $PX_{OM}$ represents that "the internal background pixel $PX_{BG\_IN\_m}$ is directly adjacent to the outmost pixels $PX_{OM}$" or "the internal background pixel $PX_{BG\_IN\_m}$ is indirectly adjacent to the outmost pixels $PX_{OM}$ through other internal background pixel $PX_{BG\_IN\_m}$".

If the internal background pixel $PX_{BG\_IN\_m}$ is connected with the plurality of outmost pixels $PX_{OM}$, in Step A04, the determining unit 18 would change the internal background label $TG_{BG,IN,m}$ corresponding to the internal background pixel $PX_{BG\_IN\_m}$, for all m, as the first label value TG1, which is the same as the one with the outmost pixels $PX_{OM}$.

After performing the process A0 on every internal background pixel $PX_{BG\_IN}$ in the binarized image BN, the internal background pixels $PX_{BG\_IN}$ which are connected with the outmost pixels $PX_{OM}$ all have the first label value TG1, as the outmost pixels $PX_{OM}$ do.

Please again refer to FIG. 14. As can be seen from the subfigure 14d, after the process 90 is performed, the label values of the interior pixels $PX_{IN\_(2,5)}$-$PX_{IN\_(5,5)}$ in the binarized image $BN_{14}$ are all 1, the label values of the interior pixels $PX_{IN\_(3,3)}$, $PX_{IN\_(3,4)}$-$PX_{IN\_(5,4)}$ in the binarized image $BN_{14}$ are all 2, and the label value of the interior pixel $PX_{IN\_(5,3)}$ in the binarized image $BN_{14}$ is 3.

The interior pixels $PX_{IN\_(2,5)}$-$PX_{IN\_(5,5)}$ are directly adjacent to the outmost pixels $PX_{OM}$, the interior pixels $PX_{IN\_(3,4)}$-$PX_{IN\_(5,4)}$ are indirectly adjacent to the outmost pixels $PX_{OM}$ through the interior pixels $PX_{IN\_(3,5)}$-$PX_{IN\_(5,5)}$, the interior pixels $PX_{IN\_(3,3)}$, $PX_{IN\_(5,3)}$ are indirectly adjacent to the outmost pixels $PX_{OM}$ through the interior pixels $PX_{IN\_(3,4)}$-$PX_{IN\_(5,4)}$, $PX_{IN\_(3,5)}$-$PX_{IN\_(5,5)}$. Therefore, the interior pixels $PX_{IN\_(3,3)}$, $PX_{IN\_(5,3)}$, $PX_{IN\_(3,4)}$-$PX_{IN\_(5,4)}$ are connected with the plurality of outmost pixels $PX_{OM}$. According to Step A04, the determining unit 18 would change the label values of the interior pixels $PX_{IN\_(3,3)}$, $PX_{IN\_(6,3)}$, $PX_{IN\_(3,\ 4)}$-$PX_{IN\_(5,4)}$ as the label value 1, which is the same as the label value of the outmost pixels $PX_{OM}$, as shown in the subfigure 14e. In addition, the interior pixels $PX_{IN\_(3,3)}$, $PX_{IN\_(5,3)}$, $PX_{IN\_(3,4)}$-$X_{IN\_(5,4)}$ having the label value 1 in the binarized image $BN_{14}$ are the plurality of second background pixels $PX_{BG2}$ stated in Step 806. As can be seen from the current embodiment (the subfigure 14e), the foreground pixels (with the null label) do not surround any of the background pixels (with the label value 1). Therefore, by Steps 304-306 of the process 30 of FIG. 3, it is determined that there is no pinch gesture in the image.

Figure 15:
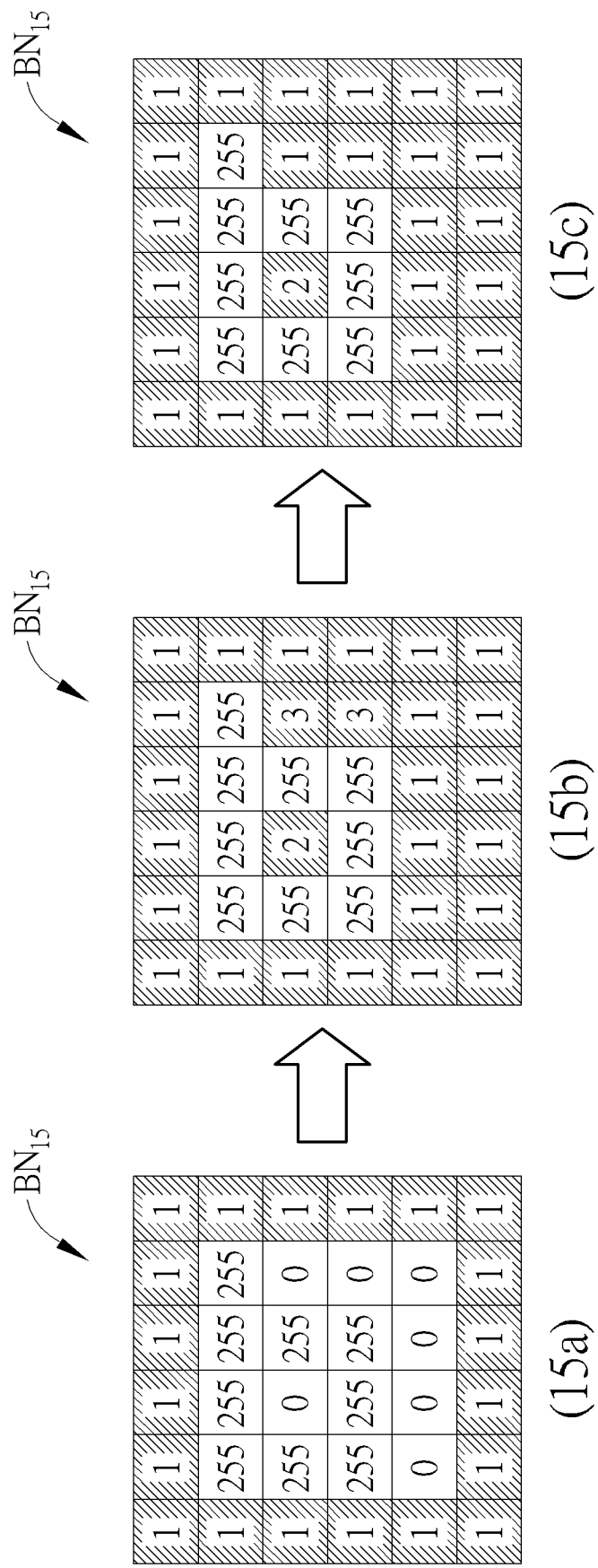
FIG. 15 illustrates results of performing the processes in FIG. 9 and FIG. 10 on a binarized image.

Please refer to FIG. 15. FIG. 15 illustrates results of performing the processes 90 and A0 on another binarized image $BN_{15}$, where the subfigure 15a illustrates a schematic diagram of the binarized image $BN_{15}$ before the determining unit 18 performs the process 90, the subfigure 15b illustrates a schematic diagram of a result of the determining unit 18 performing the process 90 on the binarized image $BN_{15}$, and the subfigure 15c illustrates a schematic diagram of a result of the determining unit 18 performing the process A0 on every internal background pixel $PX_{BG\_IN}$. Similarly, the numbers in the white squares in FIG. 15 represent the pixel values, and the numbers in the slash squares represent the label values. In FIG. 15, the horizontal raster scan from left to right is also adopted.

As can be seen from the subfigure 15b, according to the process 90, the interior pixels $PX_{IN\_(2,5)}$-$PX_{IN\_(5,5)}$ of the binarized image $BN_{15}$ are with the label value 1, the interior pixel $PX_{IN\_(3,3)}$ of the binarized image $BN_{15}$ is with the label value 2, and the interior pixels $PX_{IN\_(5,3)}$, $PX_{IN\_(5,4)}$ of the binarized image $BN_{15}$ is with the label value 3.

Since the interior pixels $PX_{IN\_(5,3)}$, $PX_{IN\_(5,4)}$ are directly adjacent to the outmost pixels $PX_{OM}$, according to Step A04, the determining unit 18 changes the label values of the interior pixels $PX_{IN\_(5,3)}$, $PX_{IN\_(5,4)}$ as the label value 1, the sane as which of the outmost pixels $PX_{OM}$, as shown in the subfigure 15c. The interior pixels $PX_{IN\_(5,3)}$, $PX_{IN\_(5,4)}$, $PX_{IN\_(2,5)}$-$PX_{IN\_(5,5)}$ being with the label value 1 represents that they are connected with the outmost pixels $PX_{OM}$. Also, the interior pixels $PX_{IN\_(5,3)}$, $PX_{IN\_(5,4)}$, $PX_{IN\_(2,5)}$-$PX_{IN\_(5,5)}$ in the binarized image $BN_{15}$ having the label value 1 are the plurality of second background pixels $PX_{BG2}$ stated in Step 806. On the other hand, the interior pixel $PX_{IN\_(3,3)}$ is not connected with the interior pixel having the label value 1. Thus, after the process A0 is performed, the label of the interior pixel $PX_{IN\_(3,3)}$ is still the label value 2, as shown in the subfigure 15c. As can be seen from the current embodiment, the foreground pixels (with the null label) do surround one background pixel (i.e., the interior pixel $PX_{IN\_(3,3)}$ with the label value 2). According to Steps 304-306 of the process 30 in FIG. 3, it is determined that there is a pinch gesture in the image.

The processes 80, 90 and A0 are details of the determining unit 18 obtaining the plurality of second background pixels $PX_{BG2}$ using the tag/class method. Specifically, after performing the process A0 on every internal background pixel $PX_{BG\_IN}$, the plurality of internal background pixels having the first label value TG1 in the binarized image BN are the plurality of second background pixels $PX_{BG2}$ stated in Steps 604 and 806. Take the subfigures 14e and 15c as examples, the plurality of internal background pixels having the label value 1 the binarized image $BN_{14}$ and $BN_{15}$ are the plurality of second background pixels $PX_{BG2}$ stated in Steps 604 and 806.

In addition, in Step 606, the determining unit 18 determines whether the third background pixel $PX_{BG3}$ which is neither the outmost pixel $PX_{OM}$ nor the second background pixel $PX_{BG2}$, exists among the plurality of background pixels $PX_{BG}$. The determining unit 18 may determine whether the third background pixel $PX_{BG3}$ exists in the binarized image BN according to a result R of performing the process A0 on every internal background pixel $PX_{BG\_IN}$. For example, the subfigure 14e or the subfigure 15c are one kind of the result R. In short, the determining unit 18 may determine whether a first internal background pixel $PX_{BG\_IN\_*}$ which does not have the first label value TG1 exists among the plurality of interior pixels $PX_{IN}$ according to the result R. If the first internal background pixel $PX_{BG\_IN\_*}$ not having the first label value TG1 exists among the plurality of interior pixels $PX_{IN}$, the determining unit 18 determines that the first internal background pixel $PX_{BG\_IN\_*}$ is the third background pixel $PX_{BG3}$ stated in Step 606.

Take the subfigure 14e as an example, there is no background pixel not having the label value 1 (corresponding to the first label value TG1) in the binarized image $BN_{14}$, which means that all of the background pixel in the binarized image $BN_{14}$ have the label value 1, a consequence of the determining unit 18 executing Step 606 according to the subfigure 14e is "negative", and the determining unit 18 may determine that there is no pinch gesture in the binarized image $BN_{14}$.

Take the subfigure 15c as an example, since the label of the interior pixel $PX_{IN\_(3,3)}$ is still the label value 2 after the process A0 is performed, which means that the interior pixel $PX_{IN\_(3,3)}$ is the first internal background pixel $PX_{BG\_IN\_*}$, and is also the third background pixel $PX_{BG3}$ stated in Step 606, the consequence of the determining unit 18 executing Step 606 according to the subfigure 15c and executing Step 304 according to the subfigure 15c is "positive". Therefore, according to the subfigure 15c, the determining unit 18 may determine that the plurality of foreground pixels $PX_{FG}$ surrounds the first background pixel $PX_{BG1}$ in the binarized image $BN_{15}$ in Step 608, and determine that the gesture is the pinch gesture in Step 306. Moreover, the interior pixel $PX_{IN\_(3,3)}$ is the third background pixel $PX_{BG3}$ stated in Step 606, and the interior pixel $PX_{IN\_(3,3)}$ is also the first background pixel $PX_{BG1}$ surrounded by the plurality of foreground pixels $PX_{FG}$ stated in Steps 608 and 304.

Notably, the embodiments stated in the above are utilized for illustrating the concept of the present invention. Those skilled in the art may make modifications and alterations accordingly, and not limited herein. For example, the plurality of outmost pixels $PX_{OM}$ may not be the pixels at the four sides of the binarized image BN. The plurality of outmost pixels $PX_{OM}$ may be the pixels on at least one side of the leftmost side, the upmost side, the rightmost side and the downmost side, which is also within the scope of the present invention.

In addition, the embodiments of the present invention stated in the above focus on determining whether the gesture is the pinch gesture, which is not limited in the present invention. The present invention may be applied to all gesture recognition method which determines whether the foreground pixels surround a part of the background pixels. The manufacturer or the user may specify a predefined gesture when it is determined that the foreground pixels surround a part of the background pixels. The predefined gesture includes but not limited to be the pinch gesture of the embodiments of the present invention, a circle gesture, a correct gesture, an okay gesture, a confirmation gesture, a lock-on gesture, an aiming gesture, a focusing gesture or other gesture which is synonymous or similar to the functional language stated in the above.

In summary, the present invention utilizes determining whether the background pixel is surrounded by the foreground pixels to determine whether the gesture is the pinch gesture; utilizes obtaining the plurality of second background pixels connected with the outmost pixels and determine whether there is the third background pixel which is not the second background pixel to determine whether the background pixel is surrounded by the foreground pixels; utilizes the tag/class method to obtain the plurality of second background pixels connected with the outmost pixels. Therefore, the present invention can determine the pinch gesture fast and efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gesture recognition method, applied in a gesture recognition module, configured to determine a gesture to operate an electronic device correspondingly, the gesture recognition method comprising:
   providing an image capturing device, wherein the image capturing device is configured to sense the gesture to generate an image;
   performing a binarization process on the image, to obtain a binarized image, wherein the binarized image comprises a plurality of foreground pixels and a plurality of background pixels, the plurality of foreground pixels is corresponding to a foreground pixel value, and the plurality of background pixels is corresponding to a background pixel value;
   determining whether the plurality of foreground pixels within the binarized image surrounds at least a first background pixel, wherein the first background pixel is one background pixel of the plurality of background pixels; and
   determining the gesture complying with a predefined gesture in response to determination that the plurality of foreground pixels surrounds the at least a first background pixel, to operate the electronic device correspondingly;
   wherein the step of determining whether the plurality of foreground pixels within the binarized image surrounds the at least a first background pixel comprises:
      obtaining a plurality of outmost pixels in the binarized image;
      among the plurality of background pixels, obtaining a plurality of second background pixels which is directly or indirectly connected with the plurality of outmost pixels;
      among the plurality of background pixels, determining whether a third background pixel, which is neither one of the plurality of outmost pixels nor one of the plurality of second background pixels, exists; and
      determining the plurality of foreground pixels surrounds the third background pixel in response to determining that the third background pixel, which is neither one of the plurality of outmost pixels nor one of the plurality of second background pixels, among the plurality of background pixels, exists, wherein the third background pixel is a part of the first background pixel.

2. The gesture recognition method of claim 1, wherein the predefined gesture is one of the following gestures: a pinch gesture, a circle gesture, a correct gesture, an okay gesture, a confirmation gesture, a lock-on gesture, an aiming gesture, a focusing gesture.

3. The gesture recognition method of claim 1, wherein the step of obtaining the plurality of second background pixels which is connected with the plurality of outmost pixels further comprises:
 labeling a plurality of outmost labels corresponding to the plurality of outmost pixels as a first label value, and labeling the plurality of foreground pixels as a null label;
 according to a scanning order, sequentially and individually determining whether a plurality of interior pixel values corresponding to a plurality of interior pixels within the binarized image is the background pixel value, and sequentially and individually determining a plurality of internal labels corresponding to the plurality of interior pixels, wherein the plurality of interior pixels in the binarized image is not the plurality of outmost pixels; and
 obtaining the plurality of second background pixels which is connected with the plurality of outmost pixels according to the plurality of internal labels of the plurality of interior pixel values.

4. The gesture recognition method of claim 3, wherein the step of according to the scanning order, sequentially and individually determining whether the plurality of interior pixel values is the background pixel value, and sequentially and individually determining the plurality of internal labels corresponding to the plurality of interior pixels further comprises:
 determining whether a first neighboring pixel to which the first interior pixel is subsequent is with a first neighboring label value in response to determining, according to the scanning order, that a first interior pixel value of a first interior pixel in the binarized image is the background pixel value, wherein the first neighboring pixel is previous to the first interior pixel in the scanning order, and the first neighboring label value is not the null label; and
 labeling a first internal label corresponding to the first interior pixel as the first neighboring label value in response to determining that the first neighboring pixel is with the first neighboring label value.

5. The gesture recognition method of claim 4, wherein the step of according to the scanning order, sequentially and individually determining whether the plurality of interior pixel values is the background pixel value, and sequentially and individually determining the plurality of internal labels corresponding to the plurality of interior pixels further comprises:
 determining whether a second neighboring pixel previous to the first interior pixel is with a second neighboring label value in response to the first neighboring pixel being with the null label, wherein the second neighboring pixel is previous to the first interior pixel in the scanning order, the first neighboring pixel and the second neighboring pixel are directly adjacent to the first interior pixel in a first direction and a second direction, respectively, the first direction is perpendicular to the second direction, the second neighboring label value is not the null label; and
 labeling the first internal label as the second neighboring label value in response to determining that the second neighboring pixel is with the second neighboring label value.

6. The gesture recognition method of claim 5, wherein the step of according to the scanning order, sequentially and individually determining whether the plurality of interior pixel values is the background pixel value, and sequentially and individually determining the plurality of internal labels corresponding to the plurality of interior pixels further comprises:
 labeling the first internal label as a second label value in response to determining that the first neighboring pixel and the second neighboring pixel are both with the null label.

7. The gesture recognition method of claim 6, wherein the step of obtaining the plurality of second background pixels which is connected with the plurality of outmost pixels according to the plurality of internal labels of the plurality of interior pixel values further comprises:
 determining whether an internal background pixel in the binarized image is connected with the plurality of outmost pixels, wherein the internal background pixel being connected with the plurality of outmost pixels represents that the internal background pixel is directly connected to the plurality of outmost pixels or the internal background pixel is indirectly connected to the plurality of outmost pixels through other internal background pixel(s), the internal background pixel is an interior pixel and is a background pixel; and
 labeling an internal background label corresponding to the internal background pixel as the first label value in response to determining that the internal background pixel are connected with the plurality of outmost pixels.

8. The gesture recognition method of claim 7, wherein the step of obtaining the plurality of second background pixels connected with the plurality of outmost pixels among the plurality of background pixels further comprises:
 obtaining the plurality of second background pixels connected with the plurality of outmost pixels among the plurality of background pixels to be a plurality of internal background pixels with the first label value among the plurality of interior pixels.

9. The gesture recognition method of claim 7, wherein the step of among the plurality of background pixels, determining whether the third background pixel, which is neither one of the plurality of outmost pixels nor one of the plurality of second background pixels, exists further comprises:
 among the plurality of interior pixels, determining whether a first internal background pixel, which is not with the first label value, exists; and
 among the plurality of background pixels, determining that the third background pixel, which is neither one of the plurality of outmost pixels nor one of the plurality of second background pixels, exists, in response to determining that among the plurality of interior pixels, the first internal background pixel which is not with the first label value exists, wherein the third background pixel is the first internal background pixel which is with the second label value.

10. A gesture recognition module, configured to operate an electronic device, comprising:
 an image capturing device, configured to sense a gesture and generate an image;

an image processing unit, configured to perform a binarization process on the image, to obtain a binarized image, wherein the binarized image comprises a plurality of foreground pixels and a plurality of background pixels, the plurality of foreground pixels is corresponding to a foreground pixel value, and the plurality of background pixels is corresponding to a background pixel value; and a determining unit, comprising a processor to perform the following steps:
  determining whether the plurality of foreground pixels within the binarized image surrounds at least a first background pixel, wherein the first background pixel is one background pixel of the plurality of background pixels; and
  determining the gesture complying with a predefined gesture in response to determination that the plurality of foreground pixels surrounds the at least a first background pixel, to operate the electronic device correspondingly;
wherein the determining unit is further configured to perform the following steps, for determining whether the plurality of foreground pixels within the binarized image surrounds the at least a first background pixel:
  obtaining a plurality of outmost pixels in the binarized image;
  among the plurality of background pixels, obtaining a plurality of second background pixels which is directly or indirectly connected with the plurality of outmost pixels;
  among the plurality of background pixels, determining whether a third background pixel, which is neither one of the plurality of outmost pixels nor one of the plurality of second background pixels, exists; and
  determining the plurality of foreground pixels surrounds the third background pixel in response to determining that the third background pixel, which is neither one of the plurality of outmost pixels nor one of the plurality of second background pixels, among the plurality of background pixels, exists, wherein the third background pixel is a part of the first background pixel.

11. The gesture recognition module of claim 10, wherein the image capturing device comprises:
  a light emitter, configured to emit an incident light to the gesture;
  a light sensor, configured to receive a reflected light corresponding to the incident light and reflected from the gesture, to generate the image corresponding to the gesture.

12. The gesture recognition module of claim 10, wherein the predefined gesture is one of the following gestures: a pinch gesture, a circle gesture, a correct gesture, an okay gesture, a confirmation gesture, a lock-on gesture, an aiming gesture, a focusing gesture.

13. The gesture recognition module of claim 10, wherein the determining unit is further configured to perform the following steps, for obtaining the plurality of second background pixels which is connected with the plurality of outmost pixels:
  labeling a plurality of outmost labels corresponding to the plurality of outmost pixels as a first label value, and labeling the plurality of foreground pixels as a null label;
  according to a scanning order, sequentially and individually determining whether a plurality of interior pixel values corresponding to a plurality of interior pixels within the binarized image is the background pixel value, and sequentially and individually determining a plurality of internal labels corresponding to the plurality of interior pixels, wherein the plurality of interior pixels in the binarized image is not the plurality of outmost pixels; and
  obtaining the plurality of second background pixels which is connected with the plurality of outmost pixels according to the plurality of internal labels of the plurality of interior pixel values.

14. The gesture recognition module of claim 13, wherein the determining unit is further configured to perform the following steps, for according to a scanning order, sequentially and individually determining whether the plurality of interior pixel values is the background pixel value, and sequentially and individually determining the plurality of internal labels corresponding to the plurality of interior pixels:
  determining whether a first neighboring pixel to which the first interior pixel is subsequent is with a first neighboring label value in response to determining, according to the scanning order, that a first interior pixel value of a first interior pixel in the binarized image is the background pixel value, wherein the first neighboring pixel is previous to the first interior pixel in the scanning order, and the first neighboring label value is not the null label; and
  labeling a first internal label corresponding to the first interior pixel as the first neighboring label value in response to determining that the first neighboring pixel is with the first neighboring label value.

15. The gesture recognition module of claim 14, wherein the determining unit is further configured to perform the following steps, for according to the scanning order, sequentially and individually determining whether the plurality of interior pixel values is the background pixel value, and sequentially and individually determining the plurality of internal labels corresponding to the plurality of interior pixels:
  determining whether a second neighboring pixel previous to the first interior pixel is with a second neighboring label value in response to the first neighboring pixel being with the null label, wherein the second neighboring pixel is previous to the first interior pixel in the scanning order, the first neighboring pixel and the second neighboring pixel are directly adjacent to the first interior pixel in a first direction and a second direction, respectively, the first direction is perpendicular to the second direction, the second neighboring label value is not the null label; and
  labeling the first internal label as the second neighboring label value in response to determining that the second neighboring pixel is with the second neighboring label value.

16. The gesture recognition module of claim 15, wherein the determining unit is further configured to perform the following steps, for according to the scanning order, sequentially and individually determining whether the plurality of interior pixel values is the background pixel value, and sequentially and individually determining the plurality of internal labels corresponding to the plurality of interior pixels:
  labeling the first internal label as a second label value in response to determining that the first neighboring pixel and the second neighboring pixel are both with the null label.

17. The gesture recognition module of claim 16, wherein the determining unit is further configured to perform the following steps, for obtaining the plurality of second background pixels which is connected with the plurality of outmost pixels according to the plurality of internal labels of the plurality of interior pixel values:

determining whether an internal background pixel in the binarized image is connected with the plurality of outmost pixels, wherein the internal background pixel being connected with the plurality of outmost pixels represents that the internal background pixel is directly connected to the plurality of outmost pixels or the internal background pixel is indirectly connected to the plurality of outmost pixels through other internal background pixel(s), the internal background pixel is an interior pixel and is a background pixel; and labeling an internal background label corresponding to the internal background pixel as the first label value in response to determining that the internal background pixel are connected with the plurality of outmost pixels.

18. The gesture recognition module of claim 17, wherein the determining unit is further configured to perform the following step, for obtaining the plurality of second background pixels connected with the plurality of outmost pixels among the plurality of background pixels:

obtaining the plurality of second background pixels connected with the plurality of outmost pixels among the plurality of background pixels to be a plurality of internal background pixels with the first label value among the plurality of interior pixels.

19. The gesture recognition module of claim 17, wherein the determining unit is further configured to perform the following steps, for among the plurality of background pixels, determining whether the third background pixel, which is neither one of the plurality of outmost pixels nor one of the plurality of second background pixels, exists:

among the plurality of interior pixels, determining whether a first internal background pixel, which is not with the first label value, exists; and among the plurality of background pixels, determining that the third background pixel, which is neither one of the plurality of outmost pixels nor one of the plurality of second background pixels, exists, in response to determining that among the plurality of interior pixels, the first internal background pixel which is not with the first label value exists, wherein the third background pixel is the first internal background pixel which is with the second label value.

20. A gesture recognition system, comprising:
an electronic device; and
a gesture recognition module, electrically coupled to the electronic device and configured to operate the electronic device, comprising:
an image capturing device, configured to sense a gesture and generate an image;
an image processing unit, configured to perform a binarization process on the image, to obtain a binarized image, wherein the binarized image comprises a plurality of foreground pixels and a plurality of background pixels, the plurality of foreground pixels is corresponding to a foreground pixel value, and the plurality of background pixels is corresponding to a background pixel value; and
a determining unit, comprising a processor to perform the following steps:
determining whether the plurality of foreground pixels within the binarized image surrounds at least a first background pixel, wherein the first background pixel is one background pixel of the plurality of background pixels; and
determining the gesture complying with a predefined gesture in response to determination that the plurality of foreground pixels surrounds the at least a first background pixel, to operate the electronic device correspondingly;
wherein the determining unit is further configured to perform the following steps, for determining whether the plurality of foreground pixels within the binarized image surrounds the at least a first background pixel:
obtaining a plurality of outmost pixels in the binarized image;
among the plurality of background pixels, obtaining a plurality of second background pixels which is directly or indirectly connected with the plurality of outmost pixels;
among the plurality of background pixels, determining whether a third background pixel, which is neither one of the plurality of outmost pixels nor one of the plurality of second background pixels, exists; and
determining the plurality of foreground pixels surrounds the third background pixel in response to determining that the third background pixel, which is neither one of the plurality of outmost pixels nor one of the plurality of second background pixels, among the plurality of background pixels, exists, wherein the third background pixel is a part of the first background pixel.

21. The gesture recognition system of claim 20, wherein the image capturing device comprises:
a light emitter, configured to emit an incident light to the gesture;
a light sensor, configured to receive a reflected light corresponding to the incident light and reflected from the gesture, to generate the image corresponding to the gesture.

22. The gesture recognition system of claim 20, wherein the predefined gesture is one gesture of the following: a pinch gesture, a circle gesture, a correct gesture, an okay gesture, a confirmation gesture, a lock-on gesture, an aiming gesture, a focusing gesture.

* * * * *